(12) United States Patent
Kinoshita et al.

(10) Patent No.: US 11,456,003 B2
(45) Date of Patent: Sep. 27, 2022

(54) ESTIMATION DEVICE, LEARNING DEVICE, ESTIMATION METHOD, LEARNING METHOD, AND RECORDING MEDIUM

(71) Applicant: NIPPON TELEGRAPH AND TELEPHONE CORPORATION, Tokyo (JP)

(72) Inventors: Keisuke Kinoshita, Kyoto (JP); Marc Delcroix, Kyoto (JP); Tomohiro Nakatani, Kyoto (JP); Shoko Araki, Kyoto (JP); Lukas Drude, Paderborn (DE); Thilo Christoph Von Neumann, Paderborn (DE)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 57 days.

(21) Appl. No.: 17/046,311

(22) PCT Filed: Jan. 29, 2019

(86) PCT No.: PCT/JP2019/003023
§ 371 (c)(1),
(2) Date: Oct. 9, 2020

(87) PCT Pub. No.: WO2019/198306
PCT Pub. Date: Oct. 17, 2019

(65) Prior Publication Data
US 2021/0366502 A1    Nov. 25, 2021

(30) Foreign Application Priority Data
Apr. 12, 2018   (JP) .............................. JP2018-076507

(51) Int. Cl.
*G10L 15/20*   (2006.01)
*G10L 15/32*   (2013.01)
(Continued)

(52) U.S. Cl.
CPC .............. *G10L 21/028* (2013.01); *G06N 3/08* (2013.01); *G10L 21/0308* (2013.01); *G10L 25/30* (2013.01)

(58) Field of Classification Search
CPC ......... G10L 15/20; G10L 21/00; G10L 15/32; G10L 15/06; G10L 15/00
See application file for complete search history.

(56) References Cited

U.S. PATENT DOCUMENTS 5,404,377 A *  4/1995  Moses ................... H04B 1/665
                                                    704/E19.009
8,392,185 B2 *  3/2013  Nakadai .............. G10L 21/0272
                                                    704/235
(Continued)

FOREIGN PATENT DOCUMENTS

JP        2014-21315 A      2/2014

OTHER PUBLICATIONS

International Search Report and Written Opinion dated Apr. 9, 2019 for PCT/JP2019/003023 filed on Jan. 29, 2019, 8 pages including English Translation of the International Search Report.
(Continued)

*Primary Examiner* — Shreyans A Patel
(74) *Attorney, Agent, or Firm* — Xsensus LLP

(57) ABSTRACT

An estimation device includes a memory, and processing circuitry coupled to the memory and configured to receive an input of an input audio signal that is an audio signal in which sounds from a plurality of sound sources are mixed, and an input of supplemental information, and output an estimation result of mask information that identifies a mask for extracting a sound of any one of the sound sources included in an entire or a part of a signal included in the input audio signal, the signal being identified by the supplemental information, cause a neural network to iterate a process of outputting the estimation result of the mask
(Continued)

information, and cause the neural network to output an estimation result of the mask information for a different sound source, by inputting a different piece of the supplemental information to the neural network at each iteration.

14 Claims, 12 Drawing Sheets

(51) Int. Cl.
*G10L 21/00* (2013.01)
*G10L 21/028* (2013.01)
*G06N 3/08* (2006.01)
*G10L 21/0308* (2013.01)
*G10L 25/30* (2013.01)

(56) References Cited

U.S. PATENT DOCUMENTS

| | | | | |
|---|---|---|---|---|
| 9,390,712 | B2* | 7/2016 | Yu | G10L 15/20 |
| 9,818,431 | B2* | 11/2017 | Yu | G10L 25/30 |
| 9,881,631 | B2* | 1/2018 | Erdogan | G10L 25/03 |
| 10,522,167 | B1* | 12/2019 | Ayrapetian | G10L 17/18 |
| 10,546,593 | B2* | 1/2020 | Wung | G10L 21/0232 |
| 2008/0167869 | A1* | 7/2008 | Nakadai | G10L 21/028 |
| | | | | 381/94.7 |
| 2016/0071526 | A1* | 3/2016 | Wingate | G01S 3/807 |
| | | | | 704/233 |
| 2017/0337924 | A1* | 11/2017 | Yu | G10L 17/18 |
| 2017/0352362 | A1* | 12/2017 | Lee | G10L 21/0272 |
| 2018/0254040 | A1* | 9/2018 | Droppo | G10L 15/20 |
| 2019/0139563 | A1* | 5/2019 | Chen | G06N 3/084 |

OTHER PUBLICATIONS

Chen et al., "Deep Attractor Network For Single-Microphone Speaker Separation", 5 Pages.
Yu et al., "Permutation invariant training of deep models for speaker-independent multi-talker speech separation", 5 pages.
Heymann et al., "Neural network based spectral mask estimation for acoustic beamforming", 2016 IEEE International Conference on Acoustics, Speech, and Signal Processing (ICASSP), Mar. 2016, pp. 196-200.
Kinoshita et al., "Listening To Each Speaker One By One With Recurrent Selective Hearing Networks", 2018 IEEE International Conference on Acoustics, Speech and Signal Processing (ICASSP), Apr. 2018, pp. 5064-5068.

* cited by examiner

ESTIMATION DEVICE, LEARNING DEVICE, ESTIMATION METHOD, LEARNING METHOD, AND RECORDING MEDIUM

CROSS-REFERENCE TO RELATED APPLICATIONS

The present application is based on PCT filing PCT/JP2019/003023, filed Jan. 29, 2019, which claims priority to JP 2018-076507, filed Apr. 12, 2018, the entire contents of each are incorporated herein by reference.

TECHNICAL FIELD

The present invention relates to an estimation device, a learning device, an estimation method, a training method, and a recording medium.

BACKGROUND ART

As sound source separation technologies for separating audio signals, in which sounds from a plurality of sound sources are mixed, into signals of the respective sound sources, there are sound source separation technologies intended for the sounds collected using a plurality of microphones, and those intended for the sounds collected using a single microphone. The latter technologies are considered more difficult than the former, because the latter cannot use information related to the sound source positions.

The technology disclosed in Non Patent Document 1 is a known example of the latter technologies, which perform the sound source separation based on input audio signal information without using the information of the sound source position.

The technology disclosed in Non Patent Document 1 converts the input audio signal into embedding vectors determined for each time frequency using a bi-directional long short-term memory (BLSTM), clusters the embedding vectors into clusters of the corresponding sound sources using k-means clustering, and estimates masks for extracting the sound sources belonging to the clusters. In the technology disclosed in Non Patent Document 1, in the process of training the parameters of the BLSTM, the parameters are updated in such a manner that the embedding vectors in the time frequencies where the sounds from a single sound source are dominant (from the viewpoint of energy) become as parallel as possible, and the embedding vectors from different sound sources become as perpendicular as possible. In the actual operation, the technology disclosed in Non Patent Document 1 converts the input audio signal to embedding vectors using a BLSTM with trained parameters, and the results are applied with k-means clustering, and an estimation of the mask is then obtained.

Also having been disclosed is a technology capable of obtaining a mask estimation for each sound source, by inputting the input audio signal directly to a neural network (NN), without requiring any process external to the NN, such as the clustering (see Non Patent Document 2).

CITATION LIST

Patent Citation

Non Patent Document 1: Zhuo Chen, Yi Luo, and Nima Mesgarani, "DEEP ATTRACTOR NETWORK FOR SINGLE-MICROPHONE SPEAKER SEPARATION", arXiv preprint arXiv:1611.08930, 2016.

Non Patent Document 2: D. Yu, M. Kolbak, Z.-H. Tan, and J. Jensen, "Permutation in-variant training of deep models for speaker-independent multi-talker speech separation", in ICASSP, 2017, pp. 241-245.

SUMMARY OF INVENTION

Technical Problem

The technology described in Non Patent Document 1 uses a two-step process of converting the input audio signal into embedding vectors using the NN (BLSTM), and applying k-means clustering. With this technology, while the BLSTM used at the first step can handle signals with an unknown number of sound sources, the k-means clustering requires the number of sound sources to be known (given in advance), and is incapable of handling sound source separation with an unknown number of sound sources.

In the technology according to Non Patent Document 2, because directly output from the NN is estimations of the masks, the number of nodes in the output layer of the NN is closely related to the separable number of sound sources. Therefore, with this technology, the number of nodes in the output layer prepared at the timing of training limits the separable number of sound sources, and therefore, it is not possible to handle arbitrary number of sound sources.

The present invention is made in consideration of the above, and an object of the present invention is to provide an estimation device, a learning device, an estimation method, a training method, and a program capable of estimating mask information for an input audio signal including arbitrary number of sound sources, regardless of the number of nodes in the NN.

Solution to Problem

To solve the above problem and attain the object, an estimation device according to the present invention includes: a memory; and processing circuitry coupled to the memory and configured to: receive an input of an input audio signal that is an audio signal in which sounds from a plurality of sound sources are mixed, and an input of supplemental information, and output an estimation result of mask information that identifies a mask for extracting a sound of any one of the sound sources included in an entire or a part of a signal included in the input audio signal, the signal being identified by the supplemental information cause a neural network to iterate a process of outputting the estimation result of the mask information. The processing circuitry is configured to cause the neural network to output an estimation result of the mask information for a different sound source, by inputting a different piece of the supplemental information to the neural network at each iteration.

A learning device according to the present invention includes: a memory; and processing circuitry coupled to the memory and configured to: receive an input of a training input audio signal that is an audio signal in which sounds from a plurality of sound sources are mixed, and an input of supplemental information, and output an estimation result of mask information that identifies a mask for extracting a sound of any one of the sound sources included in an entire or a part of a signal identified by the supplemental information, the signal being included in the training input audio signal cause a neural network to iterate a process of outputting the estimation result of the mask information update parameters of the neural network, based on a result of a comparison between information corresponding to the estimation result of the mask information obtained by the neural network, and information corresponding to correct answer mask information given in advance for the training input audio signal. The processing circuitry is configured to cause the neural network to output an estimation result of the mask information for a different sound source, by inputting a different piece of the supplemental information to the neural network at each iteration.

Advantageous Effects of Invention

According to the present invention, it is possible to estimate mask information for an input audio signal in which sounds from arbitrary number of sound sources are mixed, regardless of the number of nodes in the NN.

EMBODIMENTS FOR CARRYING OUT THE INVENTION

An estimation device, a learning device, an estimation method, a training method, and a program according to an embodiment of the present invention will now be explained in detail with reference to some drawings. The embodiments explained below are not intended to limit the scope of the present invention in any way. In the explanation hereunder, a description "^A" is equivalent of a symbol "^" appended immediately above a vector, a matrix, or a scalar "A".

First Embodiment

A configuration of a mask estimation device according to a first embodiment will now be explained. The mask estimation device according to the first embodiment estimates a mask corresponding to all of the sound sources not by estimating all of the masks at once, but by iterating a process of estimating a mask for some of the sound sources.

Figure 1:
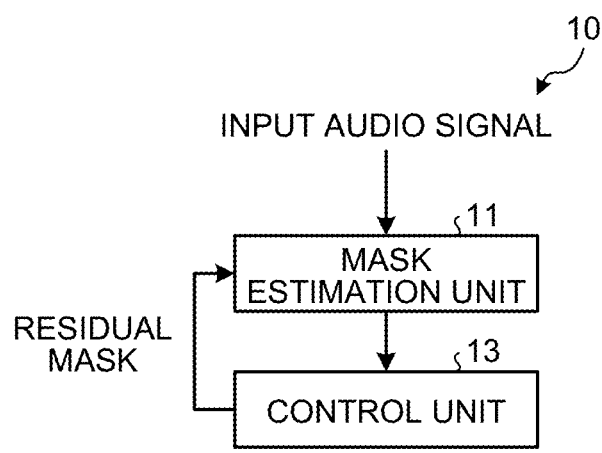
FIG. 1 is a schematic illustrating one example of a configuration of a mask estimation device according to a first embodiment.

FIG. 1 is a schematic illustrating one example of a configuration of the mask estimation device according to the first embodiment. The mask estimation device 10 according to the first embodiment is implemented as a computer, for example, including a read-only memory (ROM), a random access memory (RAN), and a central processing unit (CPU), and a predetermined program incorporated therein, by causing the CPU to execute the predetermined program, for example. As illustrated in FIG. 1, the mask estimation device 10 includes a mask estimation unit 11 (estimation unit) and a control unit 13. An audio signal that includes sounds from a plurality of sound sources, and for which a mask is to be estimated (hereinafter, referred to as an input audio signal) is input to the mask estimation device 10.

The mask estimation unit 11 includes an NN. This NN receives inputs of the input audio signal, and a residual mask that is information for identifying a signal for which a mask is to be estimated by the mask estimation unit 11 in the input audio signal. The NN then estimates and outputs the mask information corresponding to one sound source included in the signal included in the input audio signal and identified by the residual mask, and outputs a stop flag involved in stopping the mask information estimating process. It is assumed herein that the parameters of the NN have been trained in advance, using the learning device 20, for example, to be described later. In the mask estimation unit 11, the same NN is used in each process. The mask information to be estimated is information for identifying a mask for extracting the sounds corresponding to a predetermined sound source from the input audio signal, and the mask information may be the mask itself, or a combination of parameters with which a mask can be uniquely identified.

The mask estimation unit 11 establishes the signal identified by the residual mask, in the input audio signal input to the NN, as a signal of interest, and estimates and outputs a mask corresponding to one of the sound sources (presumably) included in the signal. In other words, the residual mask is supplemental information for identifying a signal of interest for which a mask is to be estimated in a current iteration of a process performed by the mask estimation unit 11, in the input audio signal. The supplemental information is used to identify the signal of interest in such a manner that the entire input audio signal is used as a signal of interest in the first iteration of the process performed by the mask estimation unit 11, but in the second iteration or thereafter, a mask is estimated by removing the signal of the sound source for which the mask information has already been estimated from the input audio signal, and establishing the remaining signal of the input audio signal as a signal of interest. In other words, the mask estimation unit 11 establishes a part of or the entire input audio signal as a signal of interest in accordance with the supplemental information, and estimates the mask information for identifying a mask corresponding to one of the sound sources included in the signal of interest.

The control unit 13 controls the mask estimation unit 11 so that the mask estimation unit 11 is caused to iterate the mask information estimating process until the stop flag output from the NN satisfies a predetermined stopping condition. In other words, when the stop flag indicates to stop the process, the control unit 13 outputs the mask information obtained for the sound sources in the past iterations, and ends the mask estimating process. When the stop flag indicates to continue the process (not to stop the process), the control unit 13 calculates a new residual mask (second residual mask) based on the residual mask (first residual mask) having been used as the input in the immediately previous process of the mask estimation unit 11, and the mask information estimated in the immediately previous process of the mask estimation unit 11, and controls to cause the mask estimation unit 11 to iterate the process again using the calculated second residual mask. The second residual mask is a mask for leaving the sounds corresponding to the remaining sound sources resultant of removing the mask information having been estimated in the immediately previous process of the mask estimation unit 11 from the first residual mask. In other words, the second residual mask is information for identifying the signal resultant of removing the signal of the sound source corresponding to the mask having been already estimated in the previous process of the mask estimation unit 11, from the input audio signal (in other words, the second residual mask is information for identifying the signal for which a mask has not been estimated yet).

Explained above is an example of a process in which a flag indicating to continue the iteration is kept being output as a stop flag, as long as there is any remaining signal corresponding to a sound source for which a mask has not been estimated yet, under an assumption that the mask information is to be estimated for all of the sound sources. However, it is needless to say that estimations of masks corresponding to all of the sound sources is not always necessary.

In summary, by causing the mask estimation unit 11 to literate the process while changing the supplemental information, the control unit 13 can cause the mask estimation unit 11 to sequentially estimate the mask information corresponding to different sound sources in the respective iterations. The control unit 13 may continue the iteration until a predetermined condition is satisfied. The number of iterations may be set depending on the purpose, e.g., may be set to the number where the estimations of the mask information are completed for the sound sources for which the mask information is to be estimated, or the number where the estimations of the mask information are completed for all of the sound sources. When it is not necessary to estimate the mask corresponding to all of the sound sources (that is, when masks corresponding to some of the sound sources are to be estimated), the control unit 13 may determine whether to continue the iteration based on the estimation result of the mask information, without using the stop flag.

[Input Signal to NN]

Figure 2:
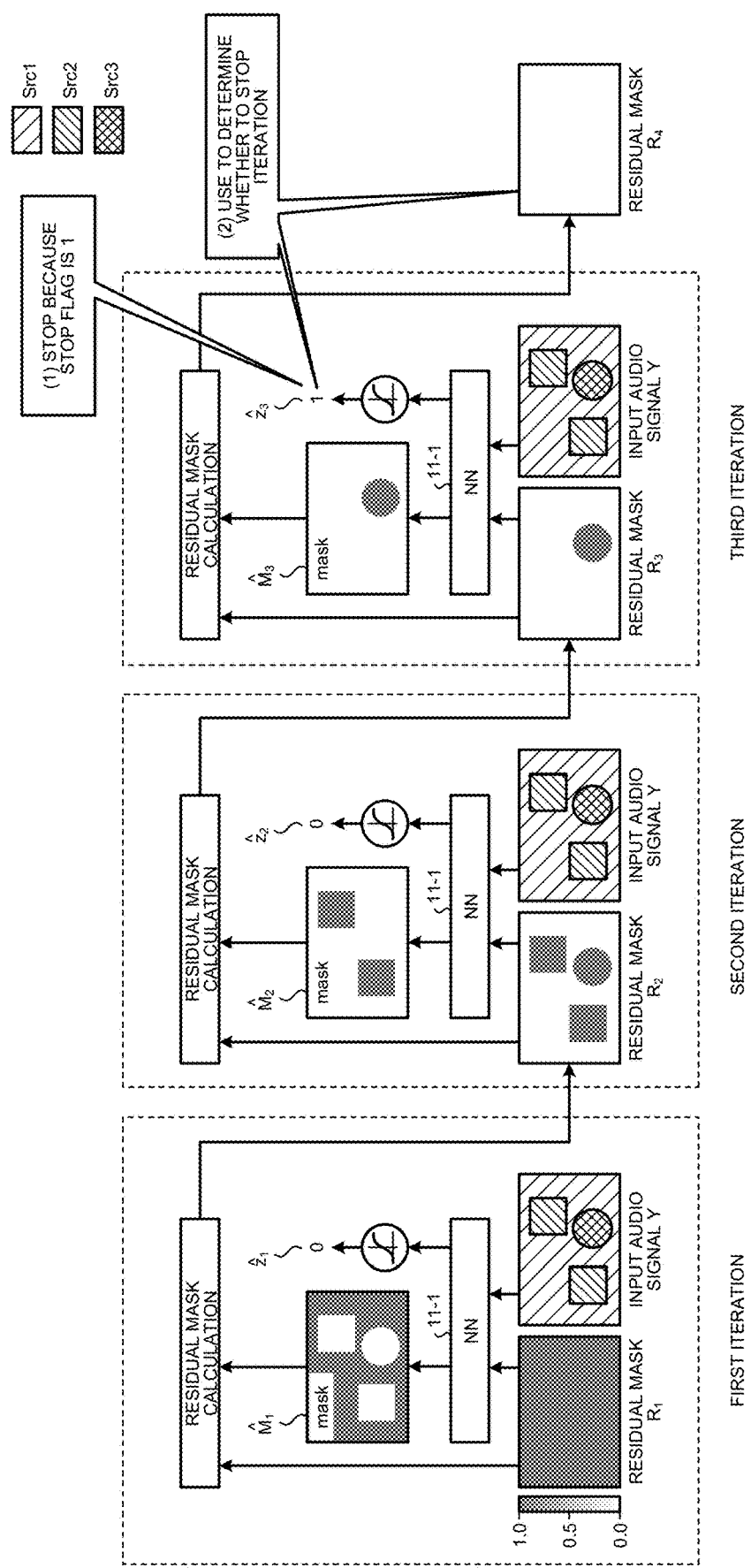
FIG. 2 is a schematic illustrating one example of a mask estimating process in the mask estimation device illustrated in FIG. 1.

As explained above, in this embodiment, an input audio signal and a residual mask are input to the mask estimation unit 11, and the mask estimation unit 11 performs the process of estimating the mask information. This process is performed iteratively, while changing the residual mask. In other words, a different residual mask (supplemental information) is input to the mask estimation unit 11 in each iteration. FIG. 2 is a schematic illustrating one example of the mask estimating process performed in the mask estimation device 10 illustrated in FIG. 1. Note that i denotes the index indicating the number of iterations (i≥1), and Y denotes the input audio signal. $R_i$ denotes the residual mask input in the $i^{th}$ iteration to the NN.

The residual mask $R_i$ is information for identifying the signal of interest in the input audio signal, the signal of interest being a signal used in the $i^{th}$ iteration of the mask estimating process. Estimated herein is the mask information corresponding to the signal from one of the sound sources the sounds of which are included in the signal of interest. To put it in other words, the residual mask serves as the supplemental information for controlling the neural network to perform the mask estimating process, using the input audio signal except for the signal corresponding to the sound source for which the mask information has already been estimated, as the signal of interest, so that the neural network is caused to estimate the mask information corresponding to one of the sound sources other than that for which the mask information has already been estimated. Therefore, used as a residual mask $R_1$ in the first iteration is information indicating that the entire input audio signal is to be subject to the process of the mask estimation unit 11.

[Output Signal From NN]

The NN implementing the mask estimation unit 11 receives inputs of the input audio signal and the residual mask, establishes the signal included in the input audio signal and identified by the residual mask as a signal of interest, and outputs a result of estimating the mask information (estimated mask information) for extracting the signal corresponding to a sound source the sound of which is presumably included in the signal, and the stop flag.

The estimated mask information output from the NN in the $i^{th}$ iteration is denoted as $\hat{M}_i$. The stop flag output from the NN in the $i^{th}$ iteration is denoted as $\hat{z}_i$.

The estimated mask information $\hat{M}_i$ is a result of a mask information estimation corresponding to the $i^{th}$ sound source, estimated by the NN in the $i^{th}$ iteration.

The stop flag $\hat{z}_i$ is a flag that is related to an instruction for stopping the iteration, and that is output from the NN in the $i^{th}$ iteration. For example, assuming that $\hat{z}_i$ takes a value of either 0 or 1, if $\hat{z}_i=1$, the iteration is stopped. If $\hat{z}_i=0$, the iteration is continued. $\hat{z}_i$ is not limited thereto, and the values may be any values as long as the values enable the determination to be made as to whether the iteration is to be continued. Furthermore, it is not a mandatory requirement for the NN to output the stop flag. When the stop flag is not to be output, for example, it is possible to make a calculation and to determine whether it is necessary to continue the iteration based on the estimated mask information $\hat{M}_1, \ldots, \hat{M}_i$ obtained in the past iterations.

[Process Performed by NN]

The NN implementing the mask estimation unit 11 establishes the signal identified by the residual mask $R_i$ in the input audio signal as a signal of interest, and outputs the result of estimating the mask for extracting the signal corresponding to one of the sound sources included in the input audio signal, as the estimated mask information, based on the input audio signal Y and the input residual mask $R_i$.

[Process of Control Unit]

The process performed by the control unit 13 will now be explained. When the mask estimation unit 11 outputs the stop flag, the control unit 13 determines whether to continue the iteration, based on the stop flag. If the iteration is to be continued, the control unit 13 calculates the residual mask $R_{i+1}$ to be used as the next input to the mask estimation unit 11, using the estimated mask information $\hat{M}_1, \ldots, \hat{M}_i$ obtained in the previous iterations up to the $i^{th}$ iteration, inputs the residual mask to the mask estimation unit 11, and controls to cause the mask estimation unit 11 to perform the process. When the mask estimation unit 11 is configured not to output the stop flag, the control unit 13 may determine whether to continue the iteration based on the estimated mask information $\hat{M}_1, \ldots, \hat{M}_i$ obtained in previous iterations up to the $i^{th}$ iteration. For example, the control unit 13 may be configured to calculate the residual mask $R_{i+1}$ based on the estimated mask information $\hat{M}_1, \ldots, \hat{M}_i$ obtained through the iterations, and to stop the iteration if there is no remaining signal (or if the remaining signal does not include any sound from any sound sources) as a result of applying the residual mask $R_{i+1}$ to the input audio signal.

As explained above, the control unit 13 is configured to cause the mask estimation unit 11 to perform the process of estimating the mask information iteratively, and, by inputting the supplemental information (residual mask) to the neural network, the control unit 13 controls to estimate the mask information corresponding to different sound sources in the respective iterations.

[Sequence of Mask Estimating Process]

The sequence of the mask estimating process performed in the mask estimation device 10 will now be explained with reference to FIG. 2.

To begin with, the first iteration will now be explained. In this example, an NN 11-1 receives an input of the input audio signal Y including the sounds from sound sources Src1 to Src3. The NN 11-1 also receives an input of a residual mask $R_1$.

When the input audio signal Y and the residual mask $R_1$ are given, for example, the NN 11-1 estimates and outputs the estimated mask information $\hat{M}_1$ for the sound source Src1, and outputs a stop flag $\hat{z}_1$ (=0).

The control unit 13 (not illustrated) determines whether to perform the iteration based on the stop flag $\hat{z}_1$. In this example, because $\hat{z}_1$=0, the control unit 13 determines to continue the iteration, and calculates a residual mask $R_2$ to be used as an input in the next iteration. The residual mask $R_2$ is information for identifying the signal resultant of removing the sounds of the sound source corresponding to the estimated mask information $\hat{M}_1$, from the input audio signal, for example, and, when the residual mask $R_1$ is the mask information covering the entire input audio signal, the residual mask $R_2$ becomes the result of removing $\hat{M}_1$ from the residual mask $R_1$. In other words, the residual mask $R_2$ can be said to be a mask passing the signal corresponding to the sound sources Src2 and Src3 for which the masks have not been estimated yet. The residual mask $R_2$ is the residual mask to be input to the NN 11-1 in the second iteration.

The second iteration will now be explained. In this iteration, the NN 11-1 is given the input audio signal Y and the residual mask $R_2$. As a result, the NN 11-1 is caused to estimate and to output the estimated mask information $\hat{M}_2$ for the sound source Src2, for example, and outputs a stop flag $\hat{z}_2$ (=0). At this time, the NN 11-1 establishes the signal identified by the residual mask $R_2$ in the input audio signal, that is, the remaining signal resultant of removing the signal from the sound source corresponding to the estimated mask information $\hat{M}_1$ from the input audio signal, as the signal of interest, and obtains the estimated mask information $\hat{M}_2$ that is the mask corresponding to Src2 that is one of the sound sources included in the signal.

Because the stop flag $\hat{z}_2$=0, the control unit 13 determines to continue the iteration, and obtains and outputs a residual mask $R_3$ that is to be used as an input in the third iteration. The residual mask $R_3$ is information for identifying the remaining signal resultant of removing the signals of the sound sources corresponding to $\hat{M}_1$ and $\hat{M}_2$ having been already estimated, from the input audio signal. For example, when the residual mask $R_1$ is the mask information covering the entire input audio signal, the residual mask $R_3$ is information having $\hat{M}_1$ and $\hat{M}_2$ removed from the residual mask $R_1$.

The third iteration will now be explained. In this iteration, the NN 11-1 is given the input audio signal Y and the residual mask $R_3$. As a result, the NN 11-1 is caused to estimate and to output mask information $\hat{M}_3$ corresponding to the sound source Src3, and outputs a stop flag $\hat{z}_3$ (=1), for example.

Because the stop flag $\hat{z}_3$=1, the control unit 13 determines to end (stop) the iteration (see (1) in FIG. 2).

In the example described above, the NN is explained to output the stop flag (see (2) in FIG. 2), but the control unit 13 may also be configured not to output the stop flag. In such a configuration, for example, to begin with, the control unit 13 calculates the residual mask $R_{i+}$, and determines whether to perform the iteration based on the result of this calculation.

[Sequence of Mask Estimating Process]

Figure 3:
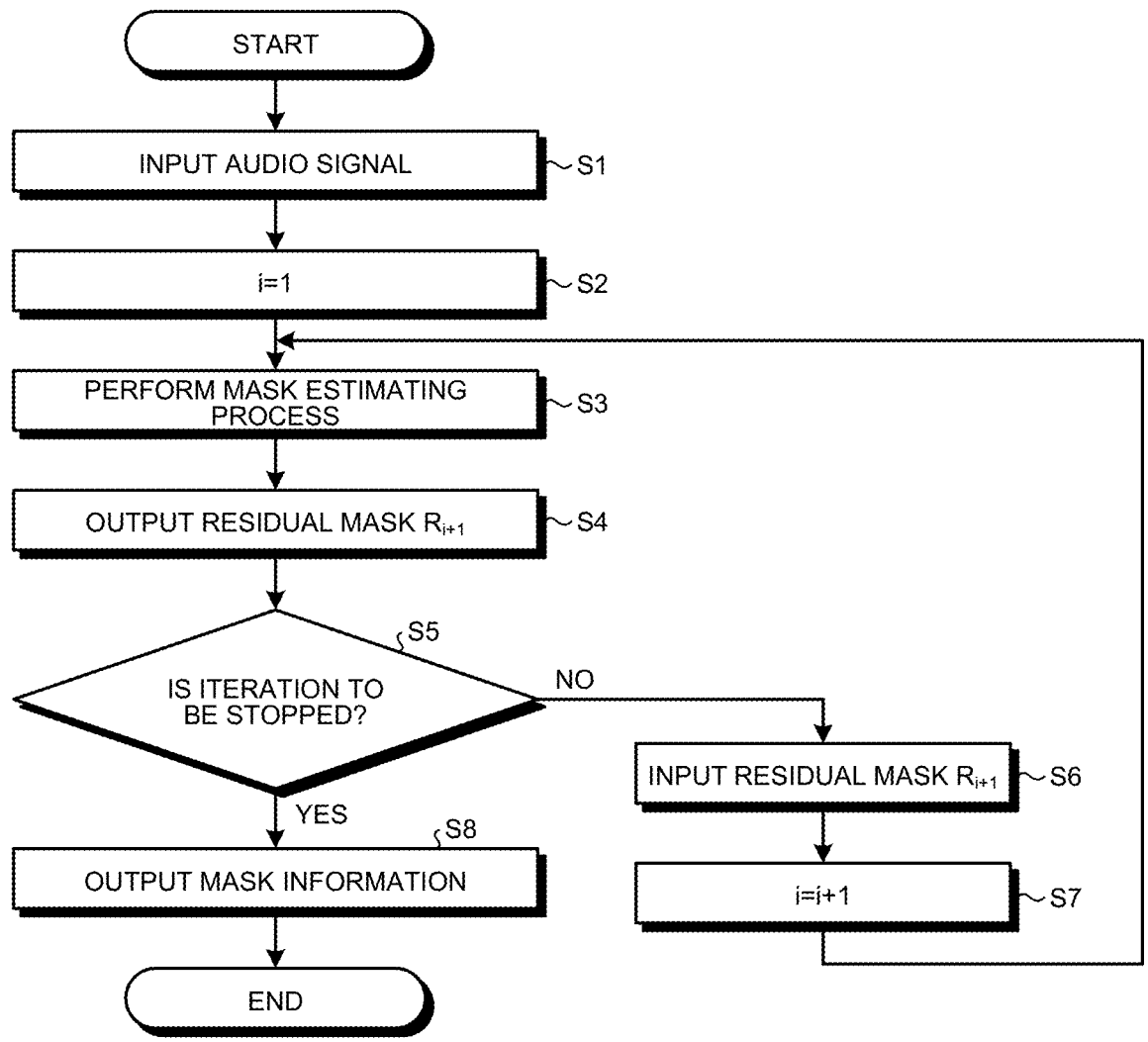
FIG. 3 is a flowchart of the sequence of the mask estimating process performed in the mask estimation device illustrated in FIG. 1.

The sequence of the mask estimating process performed in the mask estimation device 10 will now be explained with reference to FIG. 3. FIG. 3 is a flowchart of the sequence of the mask estimating process performed in the mask estimation device 10 illustrated in FIG. 1.

As illustrated in FIG. 3, to begin with, if the mask estimation device 10 receives the audio signal (input audio signal) for which a mask is to be estimated (Step S1), the mask estimation device 10 initializes the index indicating the number of iterations as i=1 (Step S2), and performs the first ($i^{th}$) iteration.

Specifically, the NN in the mask estimation unit 11 receives inputs of the input audio signal Y and the residual mask $R_i$, and the NN estimates and outputs the mask information $\hat{M}_i$ for one of the sound sources included in the input audio signal Y, and performs the mask estimating process (estimating process) for outputting a relevant stop flag $\hat{z}_i$ (Step S3). The control unit 13 then obtains new $R_{i+1}$ from the residual mask $R_i$ input to the NN and the mask information $\hat{M}_i$ estimated by the mask estimation unit 11 (Step S4), and determines whether to continue the iteration.

The control unit 13 makes the determination as to whether to stop the iteration based on whether at least one of the residual mask and the stop flag satisfies a predetermined stopping condition (Step S5).

If it is determined that the iteration is not to be stopped (No at Step S5), the control unit 13 inputs the residual mask $R_{i+1}$ together with the input audio signal Y to the NN (Step S6), sets i=i+1 (Step S7), and returns to Step S3. In the manner described above, the control unit 13 keeps inputting the residual mask output in the previous iteration from the control unit 13, and the input audio signal to the NN, and causes the NN to perform the mask information estimating process iteratively, until it is determined to stop the iteration.

If the control unit 13 determines to stop the iteration (Yes at Step S5), the mask estimation device 10 outputs the mask information obtained for each of the sound sources in the previous iterations (Step S8), and ends the mask estimating process.

Effects Achieved by First Embodiment

In the mask estimation device 10 according to the first embodiment, the NN in the mask estimation unit 11 receives the inputs of the input audio signal and the residual mask, estimates and outputs the estimated mask information corresponding one of the sound sources included in the input audio signal, and outputs a stop flag. The control unit 13 calculates a new residual mask based on the estimated mask information and the residual mask, keeps inputting the new residual mask and the input audio signal to the mask estimation unit 11, and controls to keep causing the mask estimation unit 11 to perform the mask information estimating process iteratively, until at least one of the stop flag and the new residual mask satisfies a predetermined stopping condition.

In the manner described above, the mask estimation device 10 according to the first embodiment estimates the masks for all of the sound sources by performing the process for causing the NN to estimate the masks corresponding to some of the sound sources included in the signal identified by the residual mask, in the input audio signal, iteratively, while switching the residual mask, instead of causing the NN to estimate all of the masks at once. Therefore, according to the first embodiment, it is possible to estimate mask information for an input audio signal including arbitrary number of sound sources, regardless of the number of nodes in the NN.

Furthermore, in the first embodiment, because the same NN is used in estimating the masks in all of the iterations, it is not necessary to change the configuration of the NN, even if the number of sound sources is increased.

Furthermore, in the first embodiment, because it is determined to stop the iteration based on at least one of the stop flag and the new residual mask calculated by the control unit 13, it is possible to perform the mask estimations appropriately, for all of the sound sources included in the input audio signal.

Second Embodiment

Figure 4:
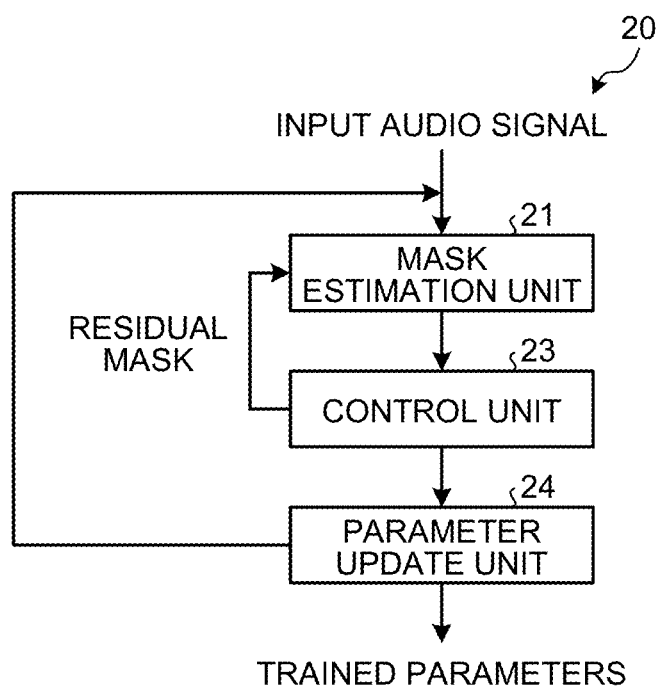
FIG. 4 is a schematic illustrating one example of a configuration of a learning device according to a second embodiment.

A second embodiment will now be explained. Explained in the first embodiment is an example in which the parameters of the NN in the mask estimation unit 11 are trained in advance. In the second embodiment, a learning device for training the parameters of the NN will now be explained. FIG. 4 is a schematic illustrating one example of a configuration of the learning device according to the second embodiment.

As illustrated in FIG. 4, the learning device 20 according to the second embodiment includes a mask estimation unit 21, a control unit 23, and a parameter update unit 24 (update unit). The training input audio signal for training, prepared in advance is input to the learning device 20. This training input audio signal is a mixed audio signal that includes a mixture of the sounds from a plurality of sound sources, and for which pieces of mask information that are the correct answers corresponding to the respective sound sources are all known.

The mask estimation unit 21 has the same function as that of the mask estimation unit 11 illustrated in FIG. 1. The mask estimation unit 21 inputs the training input audio signal and the residual mask to the NN. In response, the NN estimates the mask information for one of the sound sources included in the signal identified by the residual mask, in the training input audio signal, and outputs the estimated mask information and the stop flag. The control unit 23 estimates the mask information corresponding to different sound sources by causing the NN to perform the process iteratively, while changing the residual mask $R_i$. The same NN is used in each iteration of the mask estimation process. It is assumed that, at the time when the execution of the learning device is started, the initial parameters of the NN in the mask estimation unit 21 are set appropriately in advance.

The control unit 23 uses at least one of the stop flag $\hat{z}_i$ and the residual mask $R_{i+1}$ output from the NN in the $i^{th}$ iteration to determine whether to stop the iteration, in the same manner as the control unit 13 does, but the control unit 23 may also be configured to determine whether to stop the iteration based on a result of comparing the number of all of the sound sources included in the training input audio signal Y, with the number of iterations i. In such a case, if the number of iterations i has not reached the number of all of the sound sources, it is determined that the iteration is not to be stopped, and, if the number of iterations i has reached the number of all of the sound sources, it is determined to stop the iteration.

The parameter update unit 24 updates the parameters of the NN based on a result of comparing the correct answer for the signal from each sound source included in the training input audio signal Y with an estimation of the signal of each of the sound sources extracted based on the estimated mask information estimated in the mask estimation unit 21. The parameters of the NN are then updated in such a manner that the estimation results are brought closer to the correct answers. This may be done in accordance with a known learning algorithm such as the error back-propagation learning algorithm. For example, the parameters of the NN are updated based on a distance (loss) between the correct answer of the signal of each of the sound sources and the estimation of the signal from the corresponding sound source. The loss is not limited to a distance, as long as the loss is some scale enabling an evaluation to be made as to how much the estimated mask information, which is the estimation result of the NN, has been brought closer to the correct answer mask, and any other scale may be used.

If the loss does not satisfy a predetermined condition, the parameter update unit 24 updates the parameters of the NN in the mask estimation unit 21 based on the loss in such a manner that the estimation of the mask information is brought closer to the correct answer mask information. The amount by which the parameters are updated, for example, is determined in accordance with a known error back-propagation algorithm, for example. In other words, the amounts by which the parameters are updated are determined based on the loss calculation. After the parameters are updated, the number of iterations is initialized again, and the mask estimation unit 21 and the control unit 23 perform the mask information estimating process for each of the sound sources, using the NN having the parameters updated.

If the loss satisfies a predetermined condition (if the estimation of the mask information has sufficiently become closer to the correct answer mask information), the parameter update unit 24 ends the training process. The parameter values of the NN at the time when the training process is ended are then used as the trained parameter values.

[Loss Function]

The loss used in the parameter update unit 24 may be calculated using a predetermined loss function, for example. One example of such a loss function J is indicated below. The loss function J is given by the Equation (1), for example.

$$J = J^{(mse)} + \alpha J^{(flag)} + \beta J^{(res\text{-}mask)} \quad (1)$$

J: Loss function
$J^{(mse)}$: Mean square error between estimated mask information and correct answer mask information
$J^{(flag)}$: Loss related to stop flag
$J^{(res\text{-}mask)}$: Loss related to residual mask
α: Weight determining degree of $J^{(flag)}$ to be taken into consideration
β: Weight determining degree of $J^{(res\text{-}mask)}$ to be taken into consideration In Equation (1), α, β may be set to any values. α or β may be set to zero, and in such a case, the zero term is not considered as a loss. In other words, the loss function including zero set to α and β is equivalent to $J^{(mse)}$. Each term on the right hand side of Equation (1) will now be explained.

[$J^{(mse)}$]

To begin with, among the terms of Equation (1), $J^{(mse)}$ will be explained. $J^{(mse)}$ is a mean square error between a signal extracted using estimated mask information, and the correct answer signal of the corresponding sound source.

In each iteration, the NN is required to output a mask for one sound source the sound of which is included in the training input audio signal Y. However, it is not possible to designate the order in which the estimation is to be made for which sound source at each iteration. It would be then difficult to identify the correct answer for a certain sound source corresponding to the estimated mask information estimated at each step, but this problem can be solved by using the following method, for example. When the correct answer for a sound source corresponding to a piece of estimated mask information $\hat{M}_i$ is to be identified, the correct answer sound sources for $\hat{M}_1$ to $\hat{M}_{i-1}$ have already been determined. It is then possible to calculate, for each of the correct answer sound sources not having been associated with estimated mask information, a mean square error between the correct answer signal for that particular sound source and the estimation of the signal from the sound source estimated using the estimated mask information $\hat{M}_i$ (that is, the signal extracted by applying $\hat{M}_i$ to the input audio signal), and to establish the signal of the correct answer sound source resulted in the smallest mean square error as the signal of the correct answer sound source corresponding to the estimated mask information $\hat{M}_i$. Specifically, the training input audio signal includes segments each of which corresponds to a speech unit, and the mean square error in a speech unit is used as the loss, assuming that the mask estimating (learning) process is performed in units of a speech.

$J^{(mse)}$ is given by following Equation (2).

[Equation 2]

$$J^{(mse)} = \frac{1}{B}\sum_{i=1}^{S}\|\hat{M}_i \circ Y - A_{\phi^*}\|_F^2 \qquad (2)$$

In Equation (2), Y denotes the training input audio signal. $\hat{M}_i$ is the mask information that corresponds to one sound source, and that is estimated by the NN in the $i^{th}$ iteration. $A\phi^*$ is the amplitude spectrum of $\phi^*$. $\phi^*$ is a combination (sequence) of sound sources minimizing a speech-unit separation error. $\|\cdot\|_F$ denotes the Frobenius norm. B denotes the T×N×S, and represents the total number of time-frequency bins corresponding to the entire target sound sources. T, N, and S denote the number of time frames, the number of frequency bins, and total number of target sound sources, respectively. S corresponds to the maximum number of iterations i.

$\phi^*$ is given by following Equation (3). In Equation (3), P denotes a set of the entire combinations (sequences) of all of the sound sources.

$$\phi^* = \operatorname*{argmin}_{\phi \in \mathcal{P}} \sum_{i=1}^{S}\|\hat{M}_i \circ Y - A_\phi\|_F^2 \qquad (3)$$

$\phi^*$ is the combination of sound sources $s_i^*$ having resulted in the least loss, among those estimated in the S iterations of the mask estimating process performed by the mask estimation unit 21. Therefore, $\phi^*$ is determined after pieces of the estimated mask information corresponding to all of the sound sources are obtained by causing the mask estimation unit 21 to perform the process iteratively. In summary, $J^{(mse)}$ given by Equation (2) is a scale indicating the proximity between the signal extracted from the input audio signal by applying the estimated mask information, and the correct answer sound source signal corresponding to this mask information. Without limitation to the mean square error, any other scale may be used instead, as long as such a scale is able to evaluate the proximity.

In the example explained herein, the proximity between the estimated mask information and the correct answer mask information is evaluated using the proximity between the signal from a sound source estimated using the estimated mask information (that is, the signal resultant of applying the estimated mask information to the input audio signal), and the correct answer of the signal of the sound source, as $J^{(mse)}$. However, when the correct answer mask information is given for the purpose of training, it is possible to use the proximity between the estimation of the mask information and the correct answer mask information as $J^{(mse)}$. To put it in other words, $J^{(mse)}$ is a scale indicating the appropriateness (correctness) of the estimated mask information estimated by the NN.

[$J^{(flag)}$]

Among the terms of Equation (1), $J^{(flag)}$ will now be explained. $J^{(flag)}$ is a loss related to the stop flag. $J^{(flag)}$ is given by following Equation (4).

$$J^{(flag)} = -\sum_{i=1}^{S} z_i \ln \hat{z}_i \qquad (4)$$

In Equation (4), $\hat{z}_i$ is the stop flag output from the NN in the $i^{th}$ iteration of the mask estimation unit 11. z is a vector of the stop flag. z includes, for example, S−1 zeros. Specifically, $z=(z_1, z_2, \ldots, z_{S-1}, z_S)=(0, 0, \ldots, 0, 1)$. Therefore, $J^{(flag)}$ can be explained as a cross entropy loss between $z_i$ and $\hat{z}_i$. In other words, $J^{(flag)}$ is a scale indicating the proximity between the stop flag output from the NN (estimated stop flag) and the correct answer of the stop flag. In other words, $J^{(flag)}$ can also be said to be a scale representing the appropriateness (correctness) of the stop flag output from the NN.

[$J^{(res-mask)}$]

Among the terms of Equation (1), $J^{(res-mask)}$ will now be explained. $J^{(res-mask)}$ is a loss related to the residual mask. $J^{(res-mask)}$ is a loss in the NN pertinent to the capability of the residual mask covering the entire time-frequency bins, and extracting all of the sound sources in the training audio signal Y. At this time, in the second embodiment, a limitation is imposed on $J^{(res-mask)}$, as indicated in Equation (5). In other words, a max function is applied to $J^{(res-mask)}$ so that the residual mask $R_i$ is not processed as a minus value.

$$J^{(res-mask)} = \max\left(1 - \sum_{i=1}^{S} \hat{M}_i, 0\right) \qquad (5)$$

In other words, $J^{(res-mask)}$ is a scale that forces at least one mask has a valid value (a value sufficiently larger than zero)

at each frequency point, when the masks are estimated for all i by performing iterations. In other words, by providing $J^{(res-mask)}$, the NN is caused to make some mask estimation more actively at each of the entire time frequency points of the observed signals so that it is possible to prevent a particular time frequency point from being excluded mistakenly from the mask estimations.

Based on the above, the loss function can be said to be an index value having a correlation with the appropriateness of the estimated mask information estimated by the NN. The loss function may also take an additional index value having a correlation with the appropriateness of the stop flag into consideration.

[Sequence of Training Process]

Figure 5:
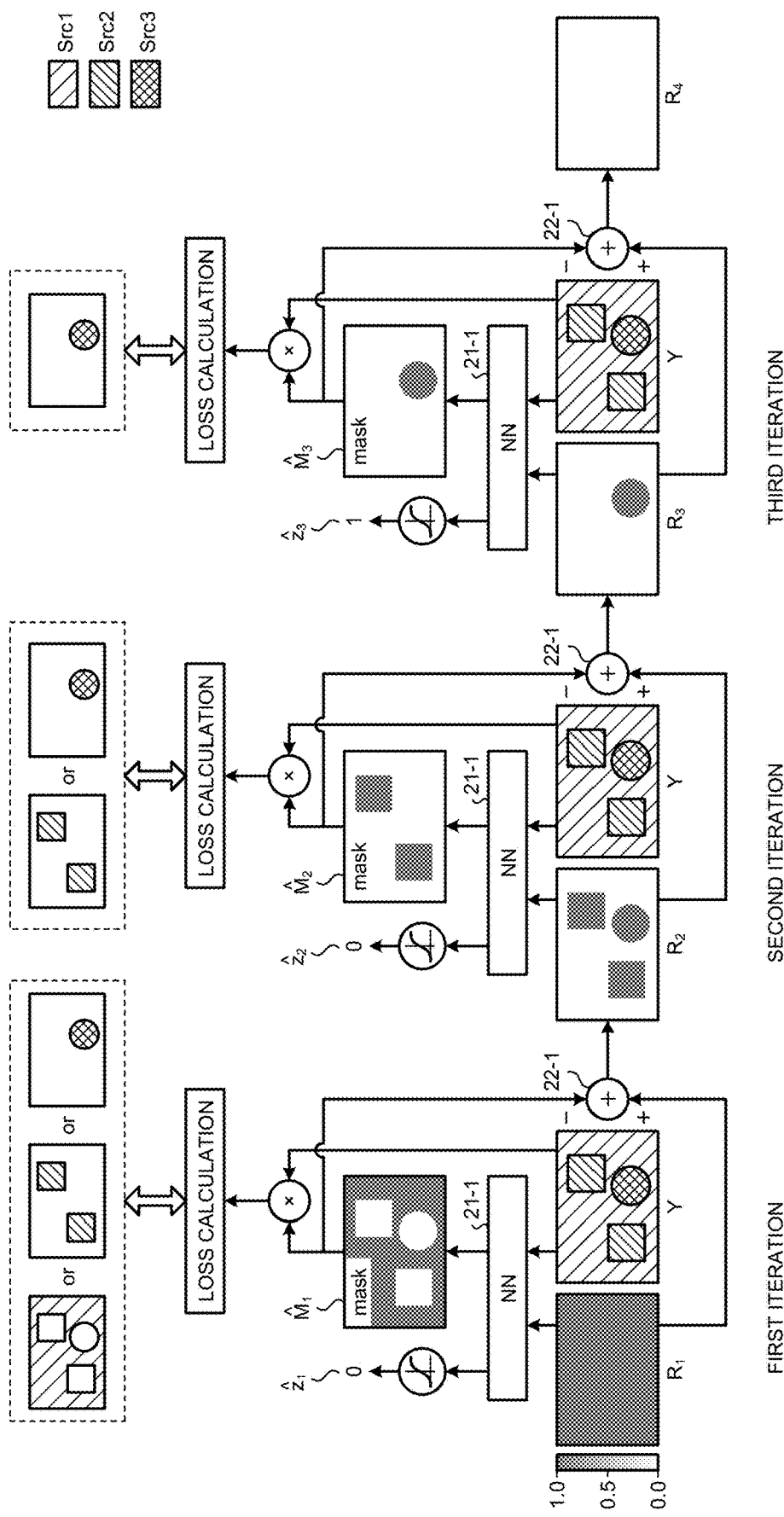
FIG. 5 is a schematic illustrating one example of a training process performed in the learning device illustrated in FIG. 4.

The sequence of the training process performed in the learning device 20 will now be explained with reference to FIG. 5. FIG. 5 is a schematic illustrating one example of the training process performed in the learning device 20 illustrated in FIG. 4.

To begin with, the first iteration will now be explained. In this example, the training input audio signal Y including the signals from the sound sources Src1 to Src3 is input to the NN 21-1. For this training input audio signal Y, pieces of correct answer mask information corresponding to the respective sound sources are known. The residual mask $R_1$ (=1) is also input to the NN 21-1. At this time, the residual mask $R_1$ is information indicating the entire input audio signal is to be subject to mask estimating process.

When the training input audio signal Y and the residual mask $R_1$ are given, the NN 21-1 establishes the signal identified by the residual mask $R_1$ in the input audio signal as a signal of interest, and estimates the estimated mask information $\hat{M}_1$ that is the estimation of information identifying a mask for extracting the signal corresponding to one of the sound sources included in the signal, and outputs the stop flag $\hat{z}_1$. The control unit 23 calculates the mean square error between the correct answer of the mask for each of the sound sources included in the training audio signal, and pieces of the estimated mask information as losses, and establishes the sound source yielding the smallest loss as the sound source intended to be estimated. In the first iteration, the control unit 23 assumes that the NN 21-1 has estimated the estimated mask information $\hat{M}_1$ corresponding to the sound source Src1 for which the smallest loss is calculated, among the sound sources Src1 to Src3. Because the number of iterations has not reached the number of sound sources (in this example, three), the control unit 23 determines to continue the iteration, and obtains the residual mask $R_2$ to be used in the second iteration, from the residual mask $R_1$ and the estimated mask information $\hat{M}_1$.

The second iteration will now be explained. In the second iteration, when the input audio signal Y and the residual mask $R_2$ are given, the NN 21-1 estimates the mask information $\hat{M}_2$, and outputs the stop flag $\hat{z}_2$. In the second iteration, the NN 21-1 estimates the mask information $\hat{M}_2$ corresponding to the sound source Src2 for which the smallest loss is calculated, among the sound sources Src2 and Src3 for which the masks have not been estimated. Because the number of iterations has not reached the number of sound sources (in this example, three), the control unit 23 determines to continue the iteration, and obtains the residual mask $R_3$ to be used in the third iteration, from the residual mask $R_2$ and the estimated mask information $\hat{M}_2$.

The third iteration will now be explained. In the third iteration, when the input audio signal Y and the residual mask $R_3$ are given, the NN 21-1 estimates the mask information $\hat{M}_3$, and outputs the stop flag $\hat{z}_2$. In the third iteration, the control unit 23 assumes that the NN 21-1 has estimated the mask information $\hat{M}_3$ corresponding to the sound source Src3 for which the mask has not been estimated yet. As a result of the third iteration, the NN 21-1 is trained with the masks for all of the sound sources, so that the control unit 23 stops the iteration, and updates the parameters.

The parameter update unit 24 calculates the loss function value, using the estimated mask information $\hat{M}_1$, $\hat{M}_2$, $\hat{M}_3$ having been obtained, and the correct answer data (the correct answer signals corresponding to the respective sound sources, or information of the correct answer masks), and determines whether it is necessary to update the parameters based on the result of the calculation. When the loss function is configured as a function taking a smaller value when the estimated mask information $\hat{M}_1$, $\hat{M}_2$, $\hat{M}_3$ are closer to the correct answer masks, if the loss function value is less than a predetermined threshold, the parameter update unit 24 outputs the current parameter values of the NN, and ends the training. If not (if the loss function value is equal to or more than the predetermined threshold), the parameter update unit 24 updates the parameter values of the NN based on the loss function value, and returns to the first iteration, and repeats the training process.

It is possible to calculate the loss function value after the estimations of the all of the masks have been completed, as explained above, or to calculate a part of the loss function (the distance between the estimated mask information $\hat{M}_i$ obtained in one iteration, and the corresponding correct answer mask) in each of the iterations, and to obtain the loss function value by integrating the results, once all of the mask estimations have been completed, as illustrated in FIG. 5.

[Sequence of Training Process]

Figure 6:
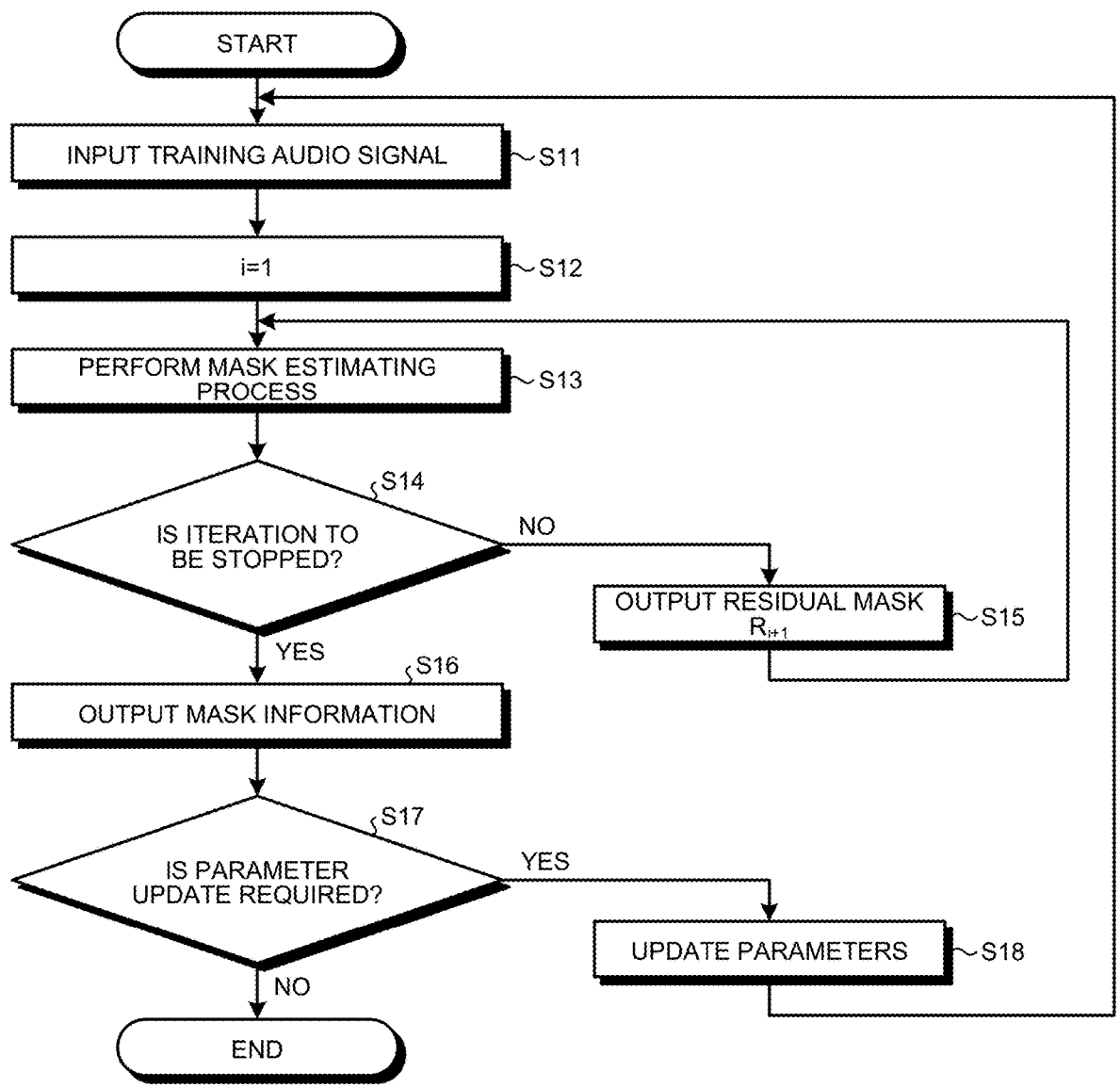
FIG. 6 is a flowchart of the sequence of the training process performed in the learning device illustrated in FIG. 4.

The sequence of the training process performed in the learning device 20 will now be explained with reference to FIG. 6. FIG. 6 is a flowchart of the sequence of a training process performed in the learning device 20 illustrated in FIG. 4.

As illustrated in FIG. 6, when the training audio signal (input audio signal) is input (Step S11), the learning device 20 initializes the index indicating the number of iterations as i=1 (Step S12), and executes the first ($i^{th}$) iteration.

Specifically, the mask estimation unit 21 causes the NN to estimate the mask information $\hat{M}_i$ for one of the sound sources included in the input audio signal Y, and the stop flag $\hat{z}_i$NN, using the training input audio signal Y and the residual mask $R_i$ (Step S13). The control unit 23 then determines whether to stop the iteration (Step S14). If the iteration is not to be stopped (continued) (No at Step S14), the control unit 23 obtains and outputs the residual mask $R_{i+1}$ based on the residual mask $R_i$ and the mask information $\hat{M}_i$ estimated by the mask estimation unit 21 (Step S15).

In the manner described above, the control unit 23 controls the mask estimation unit 21 in such a manner that the process of the NN in the mask estimation unit 21 is iterated until the control unit 23 determines to stop the iteration.

If the control unit 23 determines to stop the iteration (Yes at Step S14), the mask information having been obtained for the sound sources in the respective iterations is output to the parameter update unit 24 (Step S16).

The parameter update unit 24 calculates a loss for the estimation of the mask information using the loss function indicated in Equation (1), and determines whether it is necessary to update the parameters (Step S17). If it is determined that it is necessary to update the parameters (Yes at Step S17), the parameter update unit 24 updates the parameters (Step S18), returns to Step S11, and iterates the training process. By contrast, if it is determined that it is not necessary to update the parameters (No at Step S17), the parameter update unit 24 outputs the current parameters of the NN without updating the parameters, and ends the training process.

As to the determination of whether it is necessary to update the parameters, for example, when the loss function is a function taking a smaller value when the mask estimation result (estimated mask information) is closer to the correct answer mask, it is determined that it is necessary to update the parameters if the loss function value is equal to or more than a predetermined threshold, and determined that it is not necessary to update the parameters if the loss function value is less than the predetermined threshold, for example.

Effects Achieved by the Second Embodiment

In the learning device 20, the parameter update unit 24 obtains a loss for the estimation of the mask information using the loss function indicating the proximity between the estimated mask information and the correct answer, and updates the parameters of the NN based on the obtained loss value. At this time, the parameter update unit 24 obtains the loss using a loss function taking a smaller value when the estimation of the mask information is closer to the correct answer, and if the obtained loss is equal to or more than a predetermined threshold, the parameter update unit 24 optimizes the parameters of the NN by updating the parameters of the NN.

At this time, this loss function at least includes the index value representing the proximity between the estimated mask information and the correct answer. Therefore, the parameter update unit 24 can update the parameters of the NN in the mask estimation unit 21 in such a manner that the estimation of the mask information is brought closer to the correct answer mask information. Furthermore, an index value indicating the proximity of the stop flag to the correct answer may be included in the loss function. As a result, the parameter update unit 24 can update the parameters of the NN so that the correctness of the stop flag and the correctness of the estimated mask information also are optimized.

First Modification of Second Embodiment

A first modification of the second embodiment will now be explained.

In the initial stage of the training, the estimation accuracy of the mask information $\hat{M}_1$ is often low. Therefore, if the residual mask $R_2$ is calculated using the residual mask $R_1$ input to the learning device 20 and the mask information $\hat{M}_1$ with a low estimation accuracy in the next iteration, the accuracy of the resultant residual mask $R_2$ often becomes low. For example, if the residual mask $R_2$ has been calculated accurately, the signal identified by the residual mask $R_2$ in the input audio signal (training audio signal) becomes equal to the signal resultant of removing the signal from the sound source corresponding to the $\hat{M}_1$, from the input audio signal. If the estimation accuracy of the residual mask $R_2$ is low, a part of the signal from the sound source that corresponds to $\hat{M}_i$ and that should have been removed remains in the signal identified by the residual mask $R_2$ in the input audio signal (training audio signal).

If the next estimation of the mask information is iterated using such a low-accurate residual mask, the accuracy of the mask estimation may not improve much in the initial stage of the training, and the training may take a long time.

To avoid this issue, in the first modification of the second embodiment, to enable the mask estimation unit 21 to obtain the residual mask $R_{i+1}$ in the $(i+1)^{th}$ iteration, the mask estimation unit 21 obtains the residual mask $R_{i+1}$ based on the correct answer mask $M_i$ corresponding to the sound source estimated in the $i^{th}$ iteration, and the residual mask $R_i$ input in the $i^{th}$ iteration, without using the estimated mask $\hat{M}_i$. In other words, in each of the iterations, instead of using the low-accurate estimated mask information generated based on the immediately previous estimating process, the control unit 23 obtains the residual mask to be used in the next process, using the correct answer mask corresponding thereto.

In this first modification of the second embodiment, because the control unit 23 can use the correct residual mask generated as a result of separating the correct answer mask in all of the iterations, it is possible to prevent the low accuracy of the mask information estimation from being propagated to the next iteration, and therefore, it is possible to end the training quickly.

Second Modification of Second Embodiment

A second modification of the second embodiment will now be explained. In this second modification of the second embodiment, a correct residual mask generated by accurately separating the correct answer mask is used as an input to the mask estimation unit 21 in all of the iterations. Explained in this second modification of the second embodiment is an example in which the input to the mask estimation unit 21 is switched between the residual mask that is based on the estimated mask information and the residual mask that is based on the correct answer mask. In other words, in the second modification of the second embodiment, the residual mask generated based on the correct answer mask information, instead of the residual mask based on the estimated mask information, is input to the NN in some of the mask information estimating process and the signal separating process that are performed iteratively.

For example, if the obtained loss is equal to or more than a predetermined threshold (corresponding to a low estimation accuracy), the control unit 23 uses the residual mask based on the correct answer mask information, as an input to the NN. If the obtained loss is lower than the predetermined threshold (corresponding to an improved estimation accuracy), the control unit 23 uses the residual mask that is based on the estimated mask, as an input to the NN.

In the manner described above, in the second modification of the second embodiment, by allowing the learning device 20 itself to determine which of the residual mask that is based on the correct answer mask information and the residual mask that is based on the estimated mask is to be input to the NN in the mask estimation unit 21, it is possible to reduce the burden of the operator of the learning device 20.

For example, the NN calculates the residual mask to be obtained in the next iteration using the correct answer mask instead of the estimated mask information until the parameters reach some level of estimation accuracy, for example, until the loss function value calculated by the parameter update unit satisfies a predetermined standard.

Without limitation thereto, the learning device 20 may switch the residual mask to be input to the mask estimation unit 21 a plurality of number of times, based on the loss calculated by the control unit 23. Furthermore, without limitation to a loss-dependent rule, it is also possible for the learning device 20 to switch the residual mask to be input in accordance with a preset switching rule. Furthermore, it is also possible for an operator to specify the setting for switching the residual mask to be input to the mask estimation unit 21, in advance.

[Evaluation Experiment 1]

An evaluation experiment 1 that is an evaluation of the training method according to the second embodiment and a conventional training method will now be explained. The evaluation experiment 1 is a sound source separation experiment.

The conventional training method under the comparison is the uPIT technique (For more detail, see M. Kolbak, D. Yu, Z. Tan, and J. Jensen, "Multi-talker Speech Separation with Utterance-level Permutation Invariant Training of Deep Recurrent Neural Networks", 2017, arXiv:1703.06284. (Cited Reference 1), or D. Yu, M. Kolbak, Z.-H. Tan, and J. Jensen, "PERMUTATION INVARIANT TRAINING OF DEEP MODELS FOR SPEAKER-INDEPENDENT MULTI-TALKER SPEECH SEPARATION", in ICASSP, 2017, pp. 241-245. (Cited Reference 2)).

Furthermore, in the training method according to the second embodiment, used as the loss function J by the parameter update unit 24 are two loss functions that are the loss function indicated in Equation (6) in which $\alpha=0$, and the loss function indicated in Equation (7) in which $\beta=0$.

$$J = J^{(mse)} + \beta J^{(res-mask)} \quad (6)$$

$$J = J^{(mse)} + \alpha J^{(flag)} \quad (7)$$

Hereinafter, the method using the loss function indicated in Equation (6) will be referred to as a Res-mask model. The method using the loss function indicated in Equation (7) will be referred to as a Stop-flag model.

As the NN, a two-layer BLSTM NW was used. Each of the layers had 600 LSTM units. The residual mask was estimated using a sigmoid function. For example, the LSTM unit had 600 cells, and each of the cells is a backward/forward RNN. Furthermore, to control the training process, an Adam Optimizer having an initial learning rate of 0.001 was used. The maximum number of epochs was 200. In this experiment, two-speaker simultaneous speaking setting was used. The training data covered 30 hours. Test data covered 5 hours (open-speaker set).

The Res-mask model and the Stop-flag model were then trained using the following three training methods.

A training 1 is a method corresponding to the second embodiment. The training 1 is a method in which the residual mask $R_{i+1}$ that is the subtraction of the estimated mask information $\hat{M}_{si}^*$ from the residual mask $\hat{R}_i$ is input to the NN.

A training 2 is a method corresponding to the first modification of the second embodiment. The training 2 is a method in which the residual mask $R_{i+1}$ that is the subtraction of the correct answer mask information $M_{si}^*$ from the residual mask $R_i$ is input to the NN. This method is expected to end more quickly than that in the training 1, but may not be robust against a mask estimation error.

A training 2' corresponds to the second modification of the second embodiment, and is a method in which the training 1 and the training 2 are combined. In the training 2', for example, the method according to the first modification of the second embodiment, which uses the correct answer mask in the calculation of the residual mask, is used for the first 40 epochs, as the operational expression of the residual mask $R_{i+1}$, and subsequently, the residual mask is calculated based on the estimated mask information, in the same manner as in the second embodiment.

Table 1 indicates the results of sound source separation experiments (signal-to-distortion ratios) carried out by using the conventional uPIT technique, the Res-mask model, and the Stop-flag model. The results achieved by the Res-mask model and the Stop-flag model are indicated in a manner classified into the cases with the use of the training 1, the training 2, and the training 2'.

TABLE 1

SDR improvement (in dB) for different separation methods in clean matched condition

| | Res-mask Model | | | Stop-flag Model | | |
|---|---|---|---|---|---|---|
| uPIT | Training 1 | Training 2 | Training 2' | Training 1 | Training 2 | Training 2' |
| 7.2 | 7.8 | 7.9 | 8.6 | 7.3 | 8.8 | 8.1 |

As indicated in Table 1, while the conventional uPIT technique achieved 7.2 dB, the Res-mask model and the Stop-flag model both achieved better results than the conventional method. In particular, the Res-mask model achieved 8.6 dB as a result (training 2'), and the Stop-flag model achieved 8.8 dB that is a favorable result (training 2). In all of the experiments using the Res-mask model, a better result was achieved by using the correct answer mask, in the calculation of the residual mask to be input to the NN.

[Evaluation Experiment 2]

An evaluation experiment 2 will now be explained. In the evaluation experiment 2, the sound source counting accuracies achieved by the Res-mask model and the Stop-flag were evaluated.

In the evaluation experiment 2, zero- to two-speaker simultaneous speaking setting data was used. In this experiment, the background noise data from the ChiME real noise dataset was used to achieve an SNR mixture of 20 dB. As the training set, a 30-hour set (including the same mixture of the three) was generated. The Res-mask model and the Stop-flag model were both then trained using the method of training 2'. Note that 0.9 was set as a second threshold related to the stop flag of the Stop-flag model, and 0.1 was set as a first threshold related to the residual mask (median) of the Res-mask model. Furthermore, as test data, 10-hour multi-speaker simultaneous speaking setting data was used.

TABLE 2

Source counting accuracy (in %) of each model in mixed noisy conditions

| Exp. condition | 0 Speaker | 1 speaker | 2 speakers |
|---|---|---|---|
| Res-mask model | 100.0 | 100.0 | 99.9 |
| Stop-flag model | 100.0 | 99.9 | 96.5 |

Table 2 indicates the results of evaluations of the sound source counting accuracies achieved by the Res-mask model and the Stop-flag model. As indicated in Table 2, the Res-mask model and the Stop-flag model both succeeded to count the number of sound sources at an extremely high accuracy, at a ratio near 100%.

Therefore, it can be concluded that both of the Res-mask model and the Stop-flag model can separate the sound sources included in the input audio signal at an extremely high accuracy.

Third Embodiment

Figure 7:
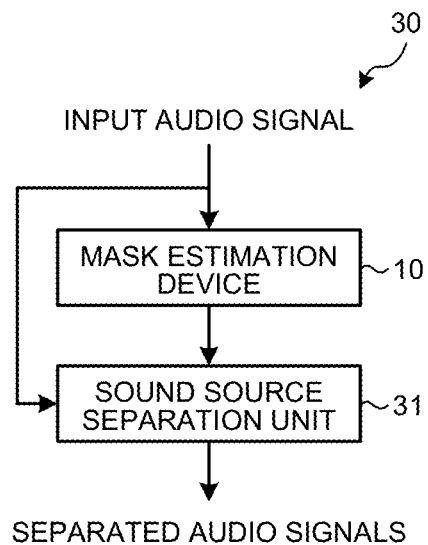
FIG. 7 is a schematic illustrating one example of a signal separation device according to a third embodiment.

A third embodiment will now be explained. In the third embodiment, a signal separation device including the mask estimation device 10 according to the first embodiment will be explained. FIG. 7 is a schematic illustrating one example of the signal separation device according to the third embodiment.

As illustrated in FIG. 7, this signal separation device 30 according to the third embodiment includes the mask estimation device 10 according to the first embodiment and a sound source separation unit 31.

The sound source separation unit 31 obtains a signal estimation result for each of the sound sources by applying a mask, which is obtained using the mask information estimated by the mask estimation device 10, to the input audio signal, and outputs the separated audio signal. When only the signal from a particular sound source is to be output, the sound source separation unit 31 may be configured to receive information identifying the sound source as an additional input, and obtain the estimation of the signal of the sound source by calculating a mask from the mask information corresponding to the input information identifying the sound source in the mask information, and applying the mask to the input audio signal.

[Sequence of Sound Source Separating Process]

Figure 8:
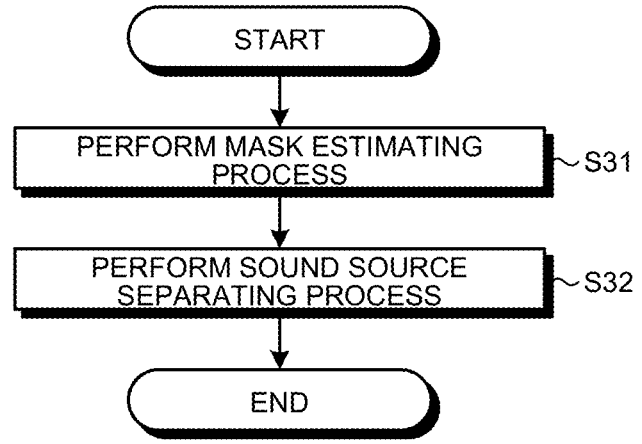
FIG. 8 is a flowchart of the sequence of a training process performed in the signal separation device illustrated in FIG. 7.

The sequence of a signal separating process performed in the signal separation device 30 will now be explained with reference to FIG. 8. FIG. 8 is a flowchart of the sequence of a training process performed in the signal separation device 30 illustrated in FIG. 7.

The mask estimation device 10 performs the mask estimating process to the input audio signal (Step S31). This mask estimating process is the same mask estimating process as illustrated in FIG. 3, and is a process of performing the estimation of the mask for one of the sound sources included in the input audio signal, iteratively.

The sound source separation unit 31 then performs the sound source separating process for obtaining a signal estimation result for each of the sound sources by applying a mask generated based on the mask information estimated in the mask estimation device 10 to the input audio signal, and for outputting the separated audio signal (Step S32).

Effects Achieved by Third Embodiment

In this signal separation device 30 according to the third embodiment, through the application of the mask estimation device 10 according to the first embodiment, it is possible to estimate mask information for the input audio signal including arbitrary number of sound sources, regardless of the number of nodes in the NN. Therefore, with the signal separation device 30, it is possible to apply an appropriate mask to each one of the sound sources, and to output separated audio signal accurately.

Fourth Embodiment

A fourth embodiment will now be explained. In the fourth embodiment, another example of the process performed in the mask estimation device 10 will be explained.

In the first embodiment, the NN implementing the mask estimation unit 11 receives two types of inputs, including the input audio signal and the residual mask. The residual mask is information for identifying a signal for which the mask is to be estimated by the mask estimation unit 11 in the input audio signal. By contrast, in the fourth embodiment, the NN implementing the mask estimation unit 11 receives three types of information, including sound source identification information that is information for identifying the sound source to be extracted by the NN, in addition to the input audio signal and the residual mask. The sound source identification information is a speaker vector, for example (the bottleneck speaker vector, in Reference 1).

(Reference 1) H. Huang, K. C. Sim: "An investigation of augmenting speaker representations to improve speaker normalisation for DNN-based speech recognition" in Proc. of IEEE ICASSP, pp. 4610-4613, 2015.

In the fourth embodiment, the NN estimates and outputs mask information for extracting the information related to the sound source identified by the sound source identification information, from the signal included in the input audio signal and identified by the residual mask. The NN then estimates and outputs the mask information, the sound source identification information corresponding to the extracted mask information, and a stop flag involved in stopping the mask information estimating process. It is assumed herein that the parameters of the NN have been trained using a learning device or the like, which will be described later. In the mask estimation unit 11, the same NN is used for the processes for extracting the respective sound sources.

In the fourth embodiment, the signal identified by the residual mask is used as a signal of interest of the input audio signal input to the NN. The mask estimation unit 11 then estimates and outputs a mask for the sound source identified by the sound source identification information, the sound source being included or presumed to be included in the signal. At this time, if the signal identified by the residual mask does not include any sound from the sound source identified by the sound source identification information, the output from the NN will be null mask information, that is, a mask that passes no input sound, and that outputs a signal at a sound pressure of 0.

In other words, the mask estimation unit 11 according to the first embodiment estimates, in each mask estimating process, a mask corresponding to one of the sound sources included in the signal identified by the residual mask. In other words, the mask estimation unit 11 according to the first embodiment, there is no designation the sound source for which a mask is to be estimated.

By contrast, in the fourth embodiment, by adding the sound source identification information as an input to the NN, the sound source identification information is used to designate the sound source for which the mask is to be estimated in each of the mask estimating processes, and the NN is caused to output a mask estimation result for the designated sound source.

[Sequence of Mask Estimating Process]

Figure 9:
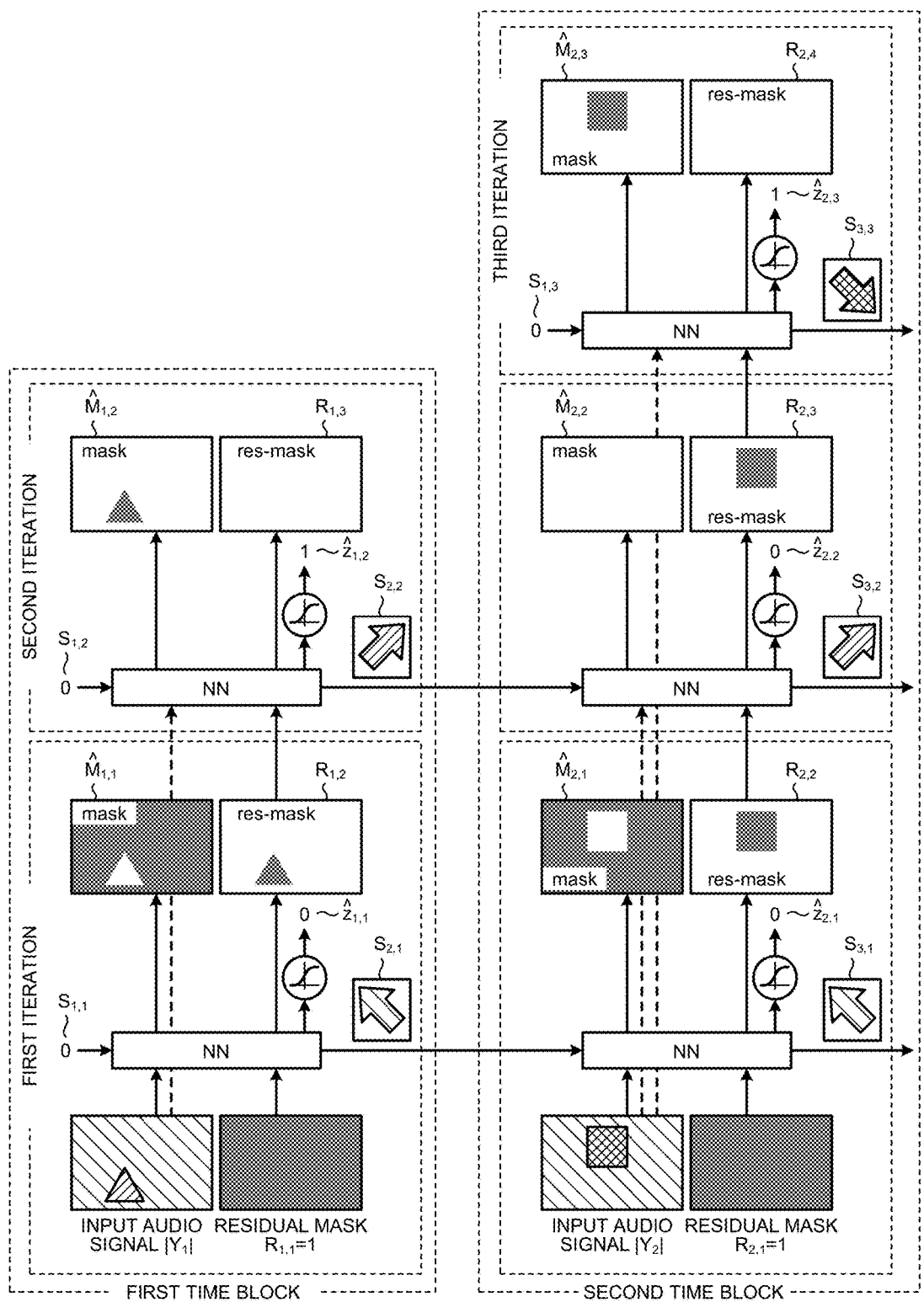
FIG. 9 is a schematic illustrating one example of a mask estimating process according to a fourth embodiment.

The mask estimating process according to the fourth embodiment will now be explained with reference to FIG. 9. FIG. 9 is a schematic illustrating one example of the mask estimating process according to the fourth embodiment.

In the fourth embodiment, the input audio signal includes two time blocks, and a mask is estimated, for each one of the sound sources, in a block online process, starting from the first time block at the head.

Furthermore, it is assumed that the input audio signal Y includes signals from the sound sources Src1 to Src3. The first time block is denoted as $Y_1$, and the second time block is denoted as $Y_2$. The sequence of the mask estimating process will now be explained using an example in which $Y_1$ includes the signals from the sound sources Src1 and Src2, and $Y_2$ includes the signals from the sound source Src1 and Src3.

[Process of First Time Block]

The first iteration of the mask estimating process applied to the first time block will now be explained. The NN receives inputs of an input audio signal $Y_1$ corresponding to the first time block, a residual mask $R_{1,1}$, and sound source identification information $S_{1,1}$. The first index given to the residual mask represents a time block index b (b=1, 2). The second index i given to the residual mask is an index representing an iteration of the mask estimating process for the corresponding time block.

In the first time block, it is assumed that the sound source identification information $S_{1,1}$ input to the NN is null information ($S_{1,1}$=0). In other words, the NN is caused to estimate a mask for one of the sound sources, without being designated with the sound source to be extracted thereby, in the same manner as in the first embodiment.

When the input audio signal $Y_1$, the residual mask $R_{1,1}$, and the sound source identification information $S_{1,1}$ (where $S_{1,1}$=0) are received, the NN is caused to estimate a mask corresponding to any one of the sound sources included in the input audio signal $Y_1$. In the example illustrated in FIG. 9, the NN estimates and outputs the estimated mask information $\hat{M}_1$ for the sound source Src1, for example. The NN then outputs sound source identification information (feature vector) $S_{2,1}$ that identifies the sound source Src1, and a stop flag $\hat{z}_{1,1}$ (=0).

The control unit 13 then determines whether to perform the iteration based on the stop flag $\hat{z}_{1,1}$. In this example, because $\hat{z}_{1,1}$=0, the control unit 13 determines to continue the iteration, and calculates a residual mask $R_{1,2}$ to be used as an input in the next iteration.

The residual mask $R_{1,2}$ is information for identifying a signal resultant of removing the sound from the sound source corresponding to the estimated mask information $\hat{M}_{1,1}$ from the input audio signal $Y_1$. For example, assuming that the residual mask $R_{1,1}$ is mask information for passing the entire input audio signal, the residual mask $R_{1,2}$ is information resultant of removing $\hat{M}_{1,1}$ from the residual mask $R_{1,1}$. In other words, the residual mask $R_{1,2}$ can be said to be a mask passing the signal corresponding to the sound sources Src2 and Src3 for which the masks have not been estimated yet. The residual mask $R_{1,2}$ is a residual mask to be input to the NN in the second iteration.

The second iteration will now be explained. In the second iteration, the NN receives inputs of the input audio signal $Y_1$, the residual mask $R_{1,2}$, and the sound source identification information $S_{1,2}$ ($S_{1,2}$=0, because to be applied with the second iteration is the first time block). As a result, for example, the NN is caused to estimate and output the estimated mask information $\hat{M}_{1,2}$ for a sound source Src2, and also output a stop flag $\hat{z}_{1,2}$ (=1), and $S_{2,2}$ that is the information for identifying the sound source Src2.

At this time, the NN uses the signal identified by the residual mask $R_{1,2}$ in the input audio signal, that is, the remaining signal resultant of removing the signal from the sound source corresponding to the estimated mask information $\hat{M}_{1,1}$ from the input audio signal, as a signal of interest. The NN then obtains the mask, that is, estimated mask information $\hat{M}_{1,2}$ corresponding to Src2 that is one of the sound sources included in the signal. Because the first time block only includes the signals corresponding to Src1 and Src2, estimations of the masks corresponding to all of the sound sources are completed in the second iteration. Therefore, the NN outputs the stop flag $\hat{z}_{1,2}$=1.

The control unit 13 then determines to stop the iteration because the stop flag $\hat{z}_{1,2}$=1. Because the process for the first time block is done, the control unit 13 causes the NN in the mask estimation unit 11 to execute the mask estimating process for the next second time block.

[Process of Second Time Block]

The first iteration applied to the second time block will now be explained. The NN receives inputs of the second time block of the input audio signal $Y_2$, a residual mask $R_{2,1}$, and the sound source identification information $S_{2,1}$ output in the first iteration of the process applied to the first time block.

The NN estimates a mask $\hat{M}_{2,1}$ for extracting the sound source identified by the sound source identification information $S_{2,1}$, that is, the signal corresponding to the sound source Src1, from the input audio signal $Y_2$. The NN then outputs the sound source identification information (feature vector) $S_{3,1}$ that identifies the sound source Src1, and a stop flag $\hat{z}_{2,1}$(=0).

The control unit 13 then determines whether to perform the iteration based on the stop flag $\hat{z}_{2,1}$. In this example, because $\hat{z}_{2,1}$=0, the control unit 13 determines to continue the iteration. The control unit 13 then calculates a residual mask $R_{2,2}$ to be used as an input in the next iteration.

The residual mask $R_{2,2}$ is information for identifying a signal resultant of removing the sound of the sound source corresponding to the estimated mask information $\hat{M}_{2,1}$, from the input audio signal $Y_2$. For example, assuming that the residual mask $R_{2,1}$ is mask information for passing the entire input audio signal, the residual mask $R_{2,2}$ is information resultant of removing $\hat{M}_{2,1}$ from the residual mask $R_{2,1}$. In other words, the residual mask $R_{2,2}$ can be said to be a mask passing the signal corresponding to the sound sources Src2 and Src3 for which the masks have not been estimated yet. The residual mask $R_{2,2}$ is a residual mask to be input to the NN in the second iteration to be applied to the second time block.

The second iteration will now be explained. In the second iteration, the NN receives inputs of the input audio signal $Y_2$, the residual mask $R_{2,2}$, and sound source identification information $S_{2,2}$. As a result, the NN is caused to obtain and to output the mask corresponding to the sound source identified by the sound source identification information $S_{2,2}$, that is, estimated mask information $\hat{M}_{2,2}$ corresponding to the sound source Src2. However, in this example, because $Y_2$ does not include the signal of the sound source Src2, $\hat{M}_{2,2}$ is null information, that is, a mask passing no signals. Furthermore, because there are signals of some of the sound sources are still in $Y_2$, the NN outputs a stop flag $\hat{z}_{2,2}$ (=0). The NN also outputs information identifying the sound source corresponding to the estimated mask information $\hat{M}_{2,2}$, that is, information identifying the sound source Src2, as the sound source identification information $S_{3,2}$.

The control unit 13 then determines whether to perform the iteration based on the stop flag $\hat{z}_{2,2}$. In this example, because $\hat{z}_{2,2}$=0, the control unit 13 determines to continue the iteration, and calculates the residual mask $R_{2,3}$ to be used as an input in the next iteration.

The residual mask $R_{2,3}$ is information for identifying a signal resultant of removing the sound of the sound source corresponding to the estimated mask information $\hat{M}_{2,1}$, and removing the sound of the sound source corresponding to the estimated mask information $\hat{M}_{2,2}$, from the input audio signal $Y_2$. For example, assuming that the residual mask $R_{2,1}$ is mask information for passing the entire input audio signal, the residual mask $R_{2,3}$ is the result of removing $\hat{M}_{2,1}$ and $\hat{M}_{2,2}$ from the residual mask $R_{2,1}$. In other words, the residual mask $R_{2,3}$ can be said to be a mask passing the signal of the sound source Src3 for which the mask has not been estimated yet. The residual mask $R_{2,3}$ is a residual mask to be input to the NN in the third iteration to be applied to the second time block.

The third iteration will now be explained. In this case, the NN receives inputs of the input audio signal $Y_2$, the residual mask $R_{2,3}$, and the sound source identification information $S_{1,3}$. At this time, because no third iteration has been performed in the first time block, the initial value of the sound source identification information (the zero that is the same value used in the first time block) is input to the NN, as the sound source identification information $S_{1,3}$. As a result, the NN is caused to output a mask corresponding to the sound source Src3 included in the signal resultant of removing the sounds of the sound source Src1 and the sound source Src2, from the input audio signal $Y_2$, as estimated mask information $\hat{M}_{2,3}$. Furthermore, because no more signal of any sound source remains in $Y_2$, the NN outputs a stop flag $\hat{z}_{2,3}$ (=1). The NN also outputs information that identifies a sound source corresponding to the estimated mask information $\hat{M}_{2,3}$, that is information that identifies the sound source Src3, as sound source identification information $S_{3,3}$.

The control unit 13 then determines to stop the iteration because the stop flag $\hat{z}_{2,3}=1$.

In the first iteration of a subsequent third time block $Y_3$, if any, the NN receives an input of the sound source identification information $S_{3,1}$, and estimates a mask corresponding to the sound source Src1 in $Y_3$. In the second iteration, the NN receives the sound source identification information $S_{3,2}$ as an input, and estimates a mask corresponding to the sound source Src2 in $Y_3$. In the third iteration, the NN receives the sound source identification information $S_{3,3}$ as an input, and estimates a mask corresponding to the sound source Src3 in $Y_3$.

In the manner described above, in the mask estimation device 10, all of the masks estimated in the $i^{th}$(i=1, 2, 3, . . . ) iteration correspond to the same sound source, among the time blocks.

[Sequence of Mask Estimating Process]

Figure 10:
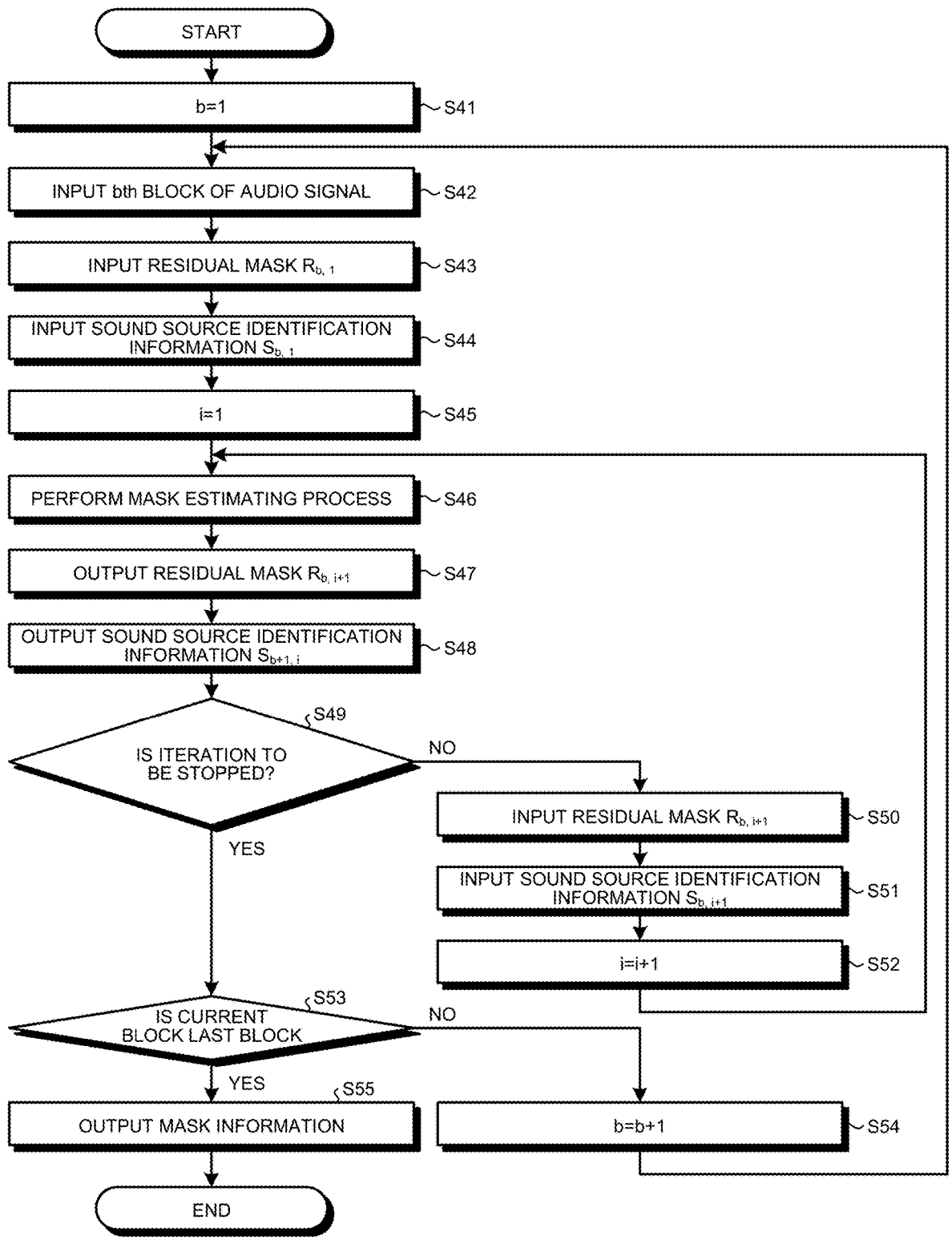
FIG. 10 is a flowchart of the sequence of the mask estimating process according to the fourth embodiment.

The sequence of the mask estimating process according to the fourth embodiment will now be explained with reference to FIG. 10. FIG. 10 is a flowchart of the sequence of the mask estimating process according to the fourth embodiment.

As illustrated in FIG. 10, to begin with, in the mask estimating process according to the fourth embodiment, the time block index is initialized as b=1 (Step S41). The NN then receives an input of the audio signal (input audio signal) $Y_b$ of the $b^{th}$ block for which a mask is to be estimated (Step S42), and also an input of a residual mask $R_{b,1}$ and an input of sound source estimation information $R_{b,1}$ (Steps S43, S44). It is assumed therein that the parameters are initialized before the process is started. The mask estimation device 10 then initializes the index indicating the number of iterations as i=1 (Step S45), and executes the first ($i^{th}$) iteration.

Specifically, the NN in the mask estimation unit 11 receives inputs of the input audio signal $Y_b$, a residual mask $R_{b,i}$, and sound source identification information $S_{b,i}$. The NN is then caused to perform a mask estimating process for estimating and outputting mask information $\hat{M}_{b,i}$ for one of the sound sources included in the input audio signal $Y_b$(Step S46). The NN then calculates and outputs new $R_{b,i+1}$ from the residual mask $R_{b,1}$ input to the NN, and the mask information $\hat{M}_{b,i}$ estimated by the mask estimation unit 11 (Step S47). The NN also outputs a stop flag $\hat{z}_{b,i}$, and sound source identification information $S_{b+1,i}$ of one of the sound sources (Step S48).

The control unit 13 determines whether to stop the iteration based on whether at least one of the residual mask and the stop flag satisfies a predetermined stopping condition (Step S49).

If it is determined that the iteration is not to be stopped (No at Step S49), the control unit 13 inputs the residual mask $R_{b,i+1}$ and the sound source identification information $S_{b,i+1}$, together with the input audio signal $Y_b$, to the NN (Steps S50, S51), sets i=i+1 (Step S52), returns to Step S46, and performs the next iteration.

If it is determined that the iteration is to be stopped (Yes at Step S49), the control unit 13 then determines whether the block of the input audio signal is the last block (Step S53). If it is determined that the current block of the input audio signal is not the last block (No at Step S53), the control unit 13 sets b=b+1 (Step S54), returns to Step S42, and performs the first iteration for the input audio signal $Y_b$ that is the next block.

If the control unit 13 determines that the block of the input audio signal is the last block (Yes at Step S53), the mask estimation device 10 outputs the mask information obtained for each of the sound sources through the iterations for all of the time blocks (Step S55), and ends the mask estimating process.

Effects Achieved by Fourth Embodiment

According to the fourth embodiment, in the mask estimation device 10, the sound source identification information is added as an input to the NN. In this manner, in the fourth embodiment, the NN receives a designation of the sound source to be estimated in the mask estimating process based on the sound source identification information, and is caused to output the mask estimation result for the designated sound source. In other words, in the mask estimation device 10 according to the fourth embodiment, all of the masks estimated in the $i^{th}$ (i=1, 2, 3, . . . ) iteration correspond to the same sound source, among the time blocks.

When the mask estimation method according to the first embodiment is used as an online process sequentially executing the process in units of a time interval having a constant length (block) as disclosed in the basic application, the correspondence between a mask output in the previous time block and another mask output in the next time block remains unknown, and it is sometimes difficult to take out a sound corresponding to a particular sound source (e.g., the voice of a specific person) in the manner following the passage of the time. Therefore, in the first embodiment, after all of the masks are output from the NN in units of one block, it is necessary to perform a post-process for identifying the masks corresponding to the same sound source across the blocks, and for re-arranging (permutating) the masks corresponding to each of the blocks, so that the masks are arranged in the same order.

By contrast, the mask estimating process according to the fourth embodiment causes the NN to estimate the mask of the sound source identified by the input sound source identification information so that the order of the sound source identification information is set in each block. As a result, in the mask estimating process according to the fourth embodiment, the order of the sound sources corresponding to the masks sequentially output by the NN is the same in each block. Therefore, in the mask estimating process according to the fourth embodiment, it is not necessary to perform the post-process required in the mask estimation method according to the first embodiment, and it is possible to keep track of the sounds of a sound source in the online process.

Fifth Embodiment

A fifth embodiment will now be explained. Explained in the fourth embodiment is an example in which the parameters of the NN in the mask estimation unit 11 are trained in advance, but, in the fifth embodiment, a learning device for training the parameters of the NN will be explained. The learning device according to the fifth embodiment has the same configuration as the learning device according to the second embodiment illustrated in FIG. 4.

[Sequence of Training Process]

The sequence of a training process according to the fifth embodiment will now be explained with reference to FIG. 11. FIG. 10 is a schematic illustrating one example of the training process according to the fifth embodiment.

In the training process according to the fifth embodiment, it is assumed that a training input audio signal including a pair of a mixed audio signal, and a piece of correct answer mask information corresponding to each sound source (or the sound source signal included in the mixed audio signal) are given. In the training process according to the fifth embodiment, a mask corresponding to each time block is estimated for the training input audio signal, by applying the same process as the mask estimating process according to the fourth embodiment.

Figure 11:
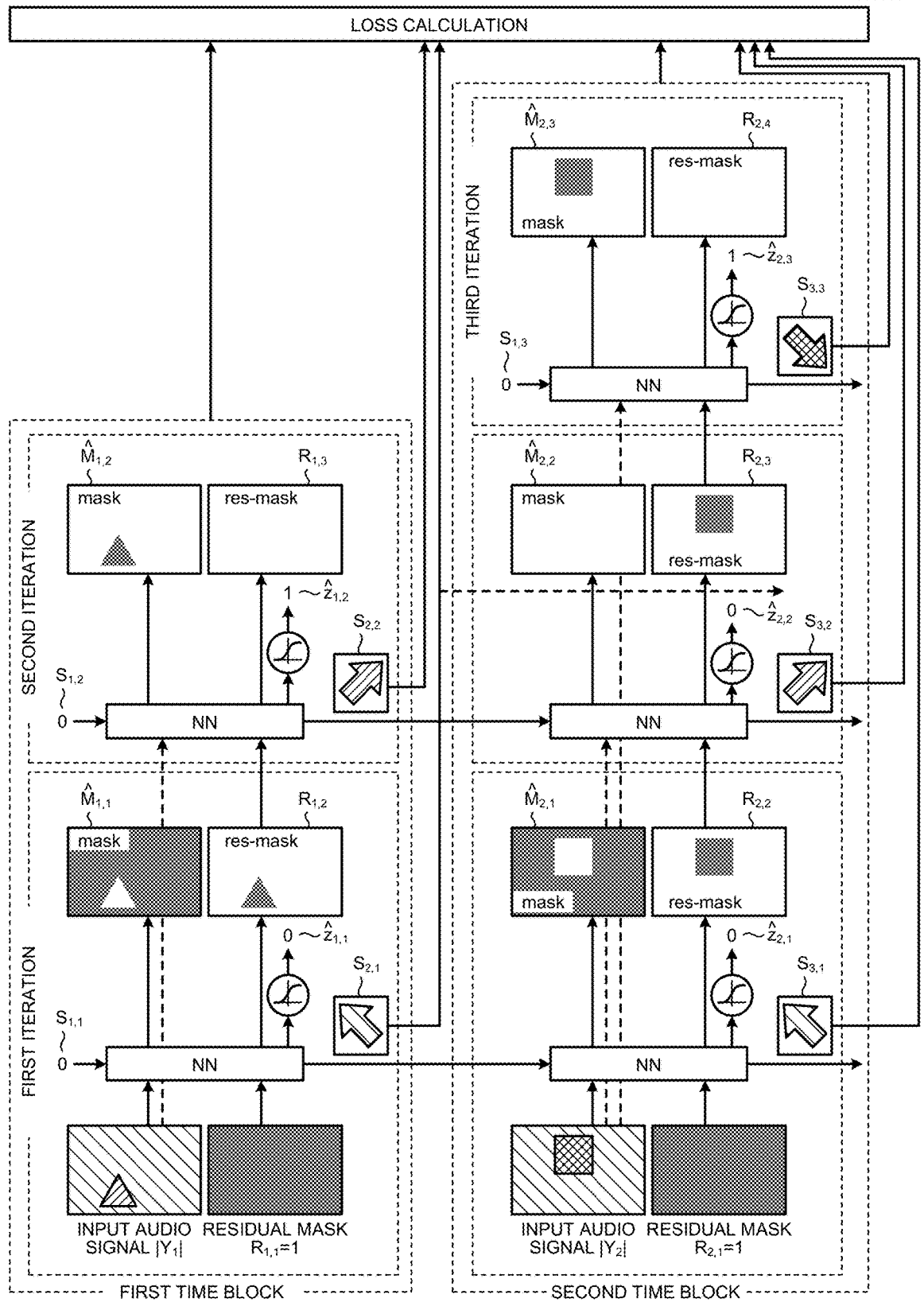
FIG. 11 is a schematic illustrating one example of a training process according to a fifth embodiment.

As illustrated in FIG. 11, in the training process, the training input audio signal $Y_b$ corresponding to a time block is input to the NN, in units of a block. The correct answer mask information corresponding to each of the sound sources is known for the training input audio signal $Y_b$. The NN receives inputs of a residual mask $R_{b,i}$ and sound source identification information $S_{b,i}$. In the same manner as in the mask estimating process, the NN estimates the estimated mask information $\hat{M}_{b,i}$ that is an estimation of the information identifying a mask for extracting the signal corresponding to one of the sound sources included in the training input audio signal $Y_b$, based on the residual mask $R_{b,i}$ and the sound source estimation information $S_{b,i}$. The NN then outputs a sound source estimation information stop flag $\hat{z}_{b,i}$ and sound source identification information $S_{b+1,i}$. If it is determined to continue the iteration based on the stop flag $\hat{z}_{b,i}$, the control unit 23 calculates a residual mask $R_{b,i+1}$ to be used as an input in the next iteration.

The parameter update unit 24 updates the parameters of the NN in such a manner that the estimation of the signal of each of the sound sources extracted based on the estimated mask information estimated by the mask estimation unit is brought closer to the correct answer signal of the corresponding sound source included in the training input audio signal. Specifically, when the estimation process by the NN is completed for all of the blocks included in the training input audio signal, and the loss calculated based on the information output from the NN does not satisfy a predetermined condition, the parameter update unit 24 updates the parameters of the NN. When the loss function is a function taking a smaller value when the estimated mask information is closer to the correct answer mask, if the loss function value is less than a predetermined threshold, the parameter update unit 24 outputs the current parameters of the NN, and ends the training.

One example of the loss function L used by the parameter update unit 24 in the loss calculation is indicated in Equation (8).

$$\mathcal{L} = L^{(MMSE)} + \alpha L^{(res-mask)} + \beta L^{(CE)} + \gamma L^{(TRIPLET)} \tag{8}$$

$\alpha$, $\beta$, and $\gamma$ are predetermined constants equal to or more than zero, and are weights for adjusting the amount by which the elements $L^{(res-mask)}$, $L^{(CE)}$, and $L^{(TRIPLET)}$ are taken into consideration, respectively. When one or more of these weights are set to zero, it means that the corresponding losses are not considered. In other words, when any of these weights is set to zero, the parameters are updated based on at least $L^{(MSE)}$.

At this time, $L^{(MMSE)}$ is given by Equation (9).

$$L^{(MMSE)} = \frac{1}{IB} \sum_{i,b} |\hat{M}_{i,b} \odot Y - A_{\phi_b}|^2 \tag{9}$$

Because the input audio signal is divided into time blocks, even though the form of the equations is different, $L^{(MMSE)}$ means the same thing as $J^{(mse)}$ in the second embodiment. $L^{(MMSE)}$ is an index value corresponding to the distance (the mean square error in this example) between the signal extracted using the estimated mask information and the correct answer sound source signal.

$L^{(res-mask)}$ corresponds to $J^{(res-mask)}$ according to the second embodiment, and represents a loss related to the residual mask. $L^{(res-mask)}$ is given by Equation (10).

$$L^{(res-mask)} = \sum_{b,t,f} \left[ \max\left(1 - \sum_i \hat{M}_{i,b}, 0\right) \right]_{tf} \tag{10}$$

$L^{(CE)}$ and $L^{(TRIPLET)}$ are scales representing the appropriateness of the estimation result of the sound source identification information. $L^{(CE)}$ denotes a softmax cross-entropy loss, that is, is a cross-entropy loss calculated from, when the output layer outputting the sound source identification information is configured as a softmax layer in the NN, the output of the softmax layer and a 1-hot vector indicating the correct answer speaker (a vector in which only the element corresponding to the correct answer speaker is set to one, and other elements are set to zero). $L^{(TRIPLET)}$ denotes a triplet loss, and given by Equation (11).

$$L^{(TRIPLET)} = \sum_{n=1}^{N} \max(s_n^{an} - s_n^{ap} + \delta, 0) \tag{11}$$

$S_n^{an}$ denotes a cosine distance between an anchor vector and a negative vector. $S_n^{ap}$ is a cosine distance between the anchor vector and a positive vector. $L^{(TRIPLET)}$ is a scale taking a smaller value when the cosine distance between the anchor vector and the positive vector is smaller, or when the cosine distance between the anchor vector and the negative vector is greater, for the set of the three (the anchor vector, the positive vector, and the negative vector).

The triplet loss is a scale for making the distance between a pair of pieces of sound source identification information corresponding to the same sound source, that is, the distance between the anchor vector and the positive vector, smaller than the distance between another pair of pieces of the sound source identification information corresponding to different sound sources, that is, the distance between the anchor vector and the negative vector. In other words, the parameter update unit 24 selects a piece of sound source identification information randomly, as an anchor vector, from the estimation results of a plurality of pieces of sound source identification information obtained in the training process. The parameter update unit 24 then calculates Equation (11), using the estimation result of the sound source identification information related to the same sound source of the sound source identification information as a positive vector, and using the estimation result of the sound source identification information related to a sound source that is different from the sound source identification information as a negative vector. σ herein is a predetermined positive constant, and preferably a small value.

[Sequence of Training Process]

Figure 12:
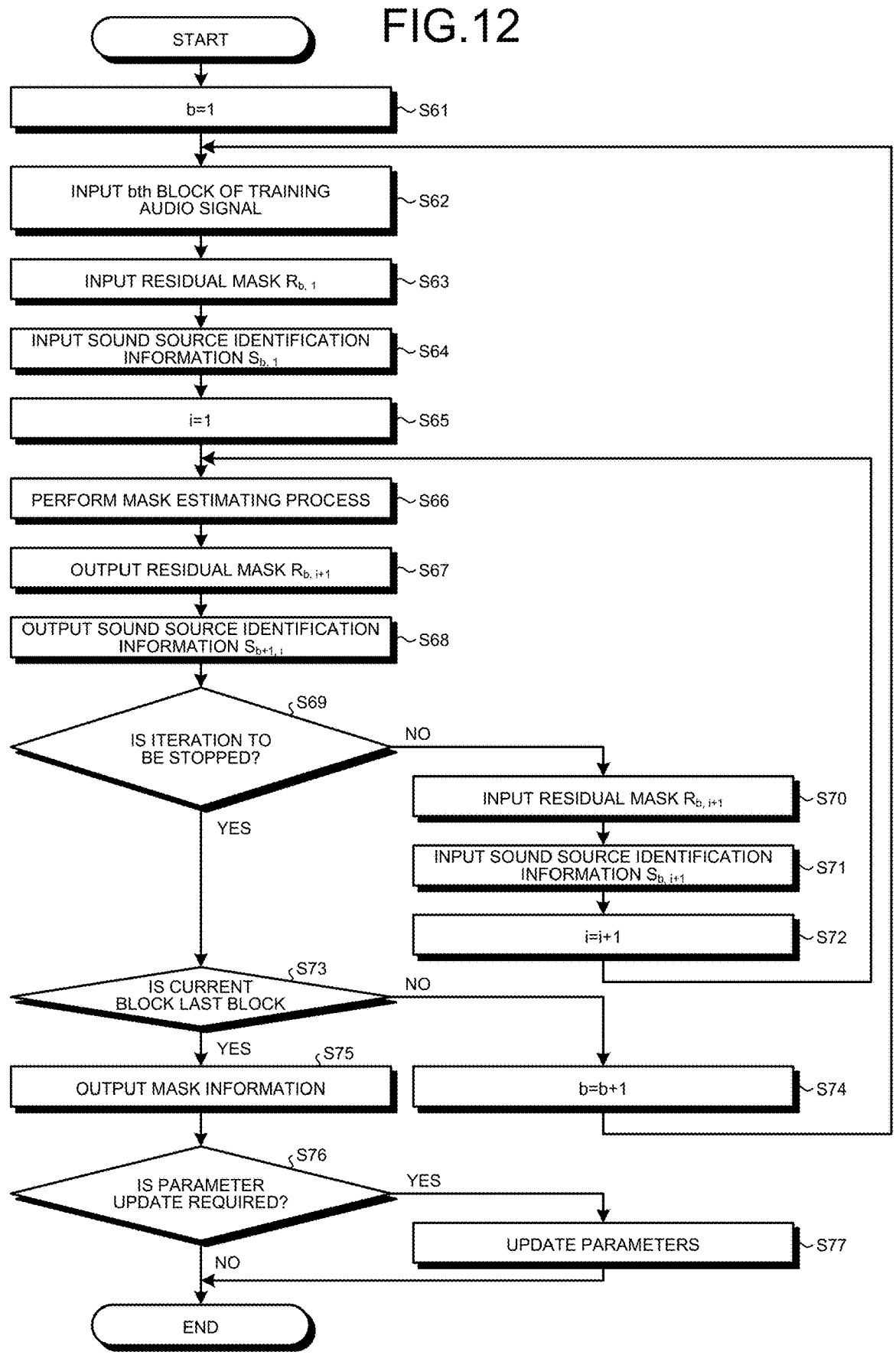
FIG. 12 is a flowchart of the sequence of a training process according to the fifth embodiment.

The sequence of a training process performed in the learning device 20 will now be explained with reference to FIG. 12. FIG. 12 is a flowchart of the sequence of the training process according to the fifth embodiment.

As illustrated in FIG. 12, in the training process according to the fifth embodiment, the time block index is initialized as b=1 (Step S61). The NN receives an input of the training audio signal (input audio signal) $Y_b$ (Step S62), as well as inputs of the residual mask $R_{b,1}$ and the sound source estimation information $S_{b,1}$ (Steps S63, S64). The learning device 20 then initializes the index indicating the number of iterations as i=1 (Step S65), and executes the first ($i^{th}$) iteration. Step S66 to Step S74 illustrated in FIG. 12 involve the same processes as those in Step S46 to Step S54 illustrated in FIG. 10.

When the mask information of each time block obtained in the iterations for each of the sound source is output (Step S75), the parameter update unit 24 calculates a loss for the estimation of the mask information, using the loss function indicated in Equation (8), and determines whether it is necessary to update the parameters (Step S76) If it is determined that it is necessary to update the parameters (Yes at Step S76), the parameter update unit 24 updates the parameters (Step S77), and ends the training process. On the other hand, if it is determined that it is not necessary to update the parameters (No at Step S76), the parameter update unit 24 outputs the current parameters of the NN, and ends the training process without updating the parameters.

Effects Achieved by Fifth Embodiment

In the fifth embodiment, it is possible to optimize the parameters of the NN by updating the parameters of the NN that performs the mask estimating process according to the fourth embodiment, through the process described above.

In the training process, by configuring the NN in such a manner that the NN outputs a mask for extracting a background noise in the first iteration, it is possible to extract the background noise in the first iteration for all of the time blocks, in the mask estimating process.

[System Configuration, etc.]

The elements included in the apparatuses illustrated in the drawings are merely functional and conceptual representations, and do not necessarily need to be physically configured as illustrated. In other words, the specific configurations in which the apparatuses are distributed or integrated are not limited to those illustrated, and the whole or a part thereof may be configured in a manner functionally or physically distributed to or integrated into any units, depending various loads and utilizations. Furthermore, the whole or a part of the processing functions executed in the apparatuses may be implemented as a CPU and a program parsed and executed by the CPU, or as hardware using a wired logic.

Furthermore, among the processes explained in the embodiments, the whole or a part of the process explained to be performed automatically may be performed manually, and the whole or a part of the process explained to be performed manually may be performed automatically using a known method. In addition, the processing sequences, the control sequences, specific names, and information including various types of data and parameters indicated in the above document or drawings may be changed in any way, unless specified otherwise.

[Program]

Figure 13:
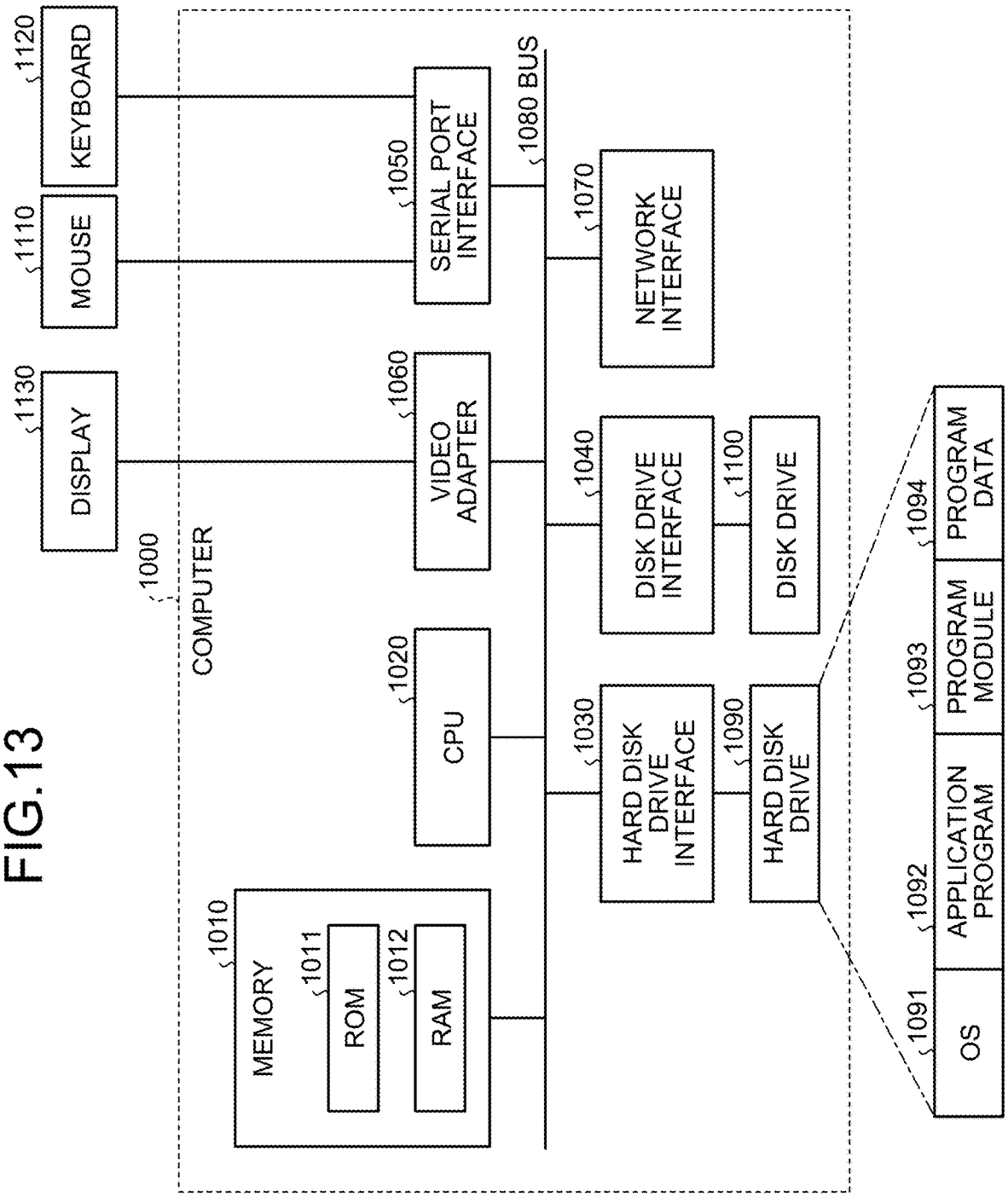
FIG. 13 is a schematic illustrating one example of a computer implementing the mask estimation device, the learning device, and the signal separation device, through an execution of a program.

FIG. 13 is a schematic illustrating one example of a computer that implements the mask estimation device 10, the learning device 20, and the signal separation device 30, through an execution of a program. The computer 1000 includes a memory 1010 and a CPU 1020, for example. In addition, the computer 1000 includes a hard disk drive interface 1030, a disk drive interface 1040, a serial port interface 1050, a video adapter 1060, and a network interface 1070. These units are connected to one another via a bus 1080.

The memory 1010 includes a ROM 1011 and a RAM 1012. The ROM 1011 stores therein a boot program such as basic input output system (BIOS), for example. The hard disk drive interface 1030 is connected to a hard disk drive 1090. The disk drive interface 1040 is connected to a disk drive 1100. For example, a removable recording medium such as a magnetic disk or an optical disc is inserted into the disk drive 1100. The serial port interface 1050 is connected to a mouse 1110 and a keyboard 1120, for example. The video adapter 1060 is connected to a display 1130, for example.

The hard disk drive 1090 stores therein an operating system (OS) 1091, an application program 1092, a program module 1093, and program data 1094, for example. In other words, a program specifying the process performed by each of the mask estimation device 10, the learning device 20, and the signal separation device 30 is implemented as the program module 1093 where a computer-executable code is described. The program module 1093 is stored in the hard disk drive 1090, for example. For example, the program module 1093 for executing the processes that are the same as those of the functional configurations of the mask estimation device 10, the learning device 20, and the signal separation device 30 are stored in the hard disk drive 1090. The hard disk drive 1090 may be replaced with a solid state drive (SSD).

Furthermore, setting data used in the processes according to the embodiment described above is stored in the memory 1010 or the hard disk drive 1090, for example, as the program data 1094. The CPU 1020 then reads and executes the program module 1093 or the program data 1094 stored in the memory 1010 or the hard disk drive 1090 onto the RAM 1012, as required.

The program module 1093 and the program data 1094 are not limited to those stored in the hard disk drive 1090, and may be stored in a removable recording medium, for example, and be read by the CPU 1020 via the disk drive 1100, for example. The program module 1093 and the program data 1094 may be stored in another computer connected via a network (a local area network (LAN) or a wide area network (WAN), for example). The program module 1093 and the program data 1094 may then be read by the CPU 1020 from the other computer, via the network interface 1070, for example.

While some embodiments applied with the invention made by the inventors are explained above, the descriptions and the drawings making up a part of the disclosure of the present invention by the embodiments are not intended to limit the scope of the present invention in any way. In other words, any other embodiments, examples, operational technologies, and the like that are achieved by those skilled in the art, for example, on the basis of the embodiments all fall within the scope of the present invention.

Description of Signs

10 mask estimation device
11, 21 mask estimation unit
13, 23 control unit
20 learning device
24 parameter update unit
30 signal separation device
31 sound source separation unit

The invention claimed is:

1. An estimation device comprising:
a memory; and
processing circuitry coupled to the memory and configured to:
receive an input of an input audio signal that is an audio signal in which sounds from a plurality of sound sources are mixed, and an input of supplemental information, and output an estimation result of mask information that identifies a mask for extracting a sound of any one of the sound sources included in an entire or a part of a signal included in the input audio signal, the signal being identified by the supplemental information,
cause a neural network to iterate a process of outputting the estimation result of the mask information, and
cause the neural network to output an estimation result of the mask information for a different sound source, by inputting a different piece of the supplemental information to the neural network at each iteration, wherein
the supplemental information is information for identifying a remaining signal resultant of removing a signal of a sound source corresponding to the estimation result of the mask information obtained in a past, the signal being included in the input audio signal, from the input audio signal.

2. The estimation device according to claim 1, wherein
the supplemental information also includes sound source identification information for identifying a sound source to be extracted by the neural network, and
the processing circuitry is further configured to output an estimation result of mask information that identifies a mask for extracting a sound of the sound source corresponding to the sound source identification information.

3. A learning device comprising:
a memory; and
processing circuitry coupled to the memory and configured to:
receive an input of a training input audio signal that is an audio signal in which sounds from a plurality of sound sources are mixed, and an input of supplemental information, and output an estimation result of mask information that identifies a mask for extracting a sound of any one of the sound sources included in an entire or a part of a signal identified by the supplemental information, the signal being included in the training input audio signal,
cause a neural network to iterate a process of outputting the estimation result of the mask information,
update parameters of the neural network, based on a result of a comparison between information corresponding to the estimation result of the mask information obtained by the neural network, and information corresponding to correct answer mask information given in advance for the training input audio signal,
cause the neural network to output an estimation result of the mask information for a different sound source, by inputting a different piece of the supplemental information to the neural network at each iteration, wherein
the supplemental information is information for identifying a remaining signal resultant of removing a signal of a sound source corresponding to the estimation result of the mask information obtained in a past, the signal being included in the input audio signal, from the input audio signal.

4. A learning device comprising:
a memory; and
processing circuitry coupled to the memory and configured to:
receive an input of a training input audio signal that is an audio signal in which sounds from a plurality of sound sources are mixed, and an input of supplemental information, and output an estimation result of mask information that identifies a mask for extracting a sound of any one of the sound sources included in an entire or a part of a signal identified by the supplemental information, the signal being included in the training input audio signal,
cause a neural network to iterate a process of outputting the estimation result of the mask information,
update parameters of the neural network, based on a result of a comparison between information corresponding to the estimation result of the mask information obtained by the neural network, and information corresponding to correct answer mask information given in advance for the training input audio signal,
cause the neural network to output an estimation result of the mask information for a different sound source, by inputting a different piece of the supplemental information to the neural network at each iteration, wherein the supplemental information is information for identifying a remaining signal resultant of removing a signal of a sound source corresponding to the estimation result of the mask information obtained in a past, the signal being included in the input audio signal, from the input audio signal, and
update parameters of the neural network in such a manner that the estimation result of the mask information is brought closer to the correct answer mask information.

5. The learning device according to claim 4, wherein the processing circuitry is further configured to:
output a stop flag enabling the processing circuitry to determine whether to continue an iteration, in addition to the estimation result of the mask information, and update parameters of the neural network in such a manner that the stop flag is brought closer to a correct answer of the stop flag, the correct answer being given in advance.

6. The learning device according to claim 4, wherein the processing circuitry is further configured to update parameters of the neural network in such a manner that supplemental information in each iteration performed by the processing circuitry is brought closer to a correct answer of the supplemental information, the correct answer being given in advance.

7. The learning device according to claim 6, wherein the processing circuitry is further configured to:
output a stop flag enabling the processing circuitry to determine whether to continue an iteration, in addition to the estimation result of the mask information, and
update parameters of the neural network in such a manner that the stop flag is brought closer to a correct answer of the stop flag, the correct answer being given in advance.

8. The learning device according to claim 3, wherein the supplemental information further includes sound source identification information for identifying a sound source to be extracted by the neural network, and
the processing circuitry is further configured to output an estimation result of mask information that identifies a mask for extracting a sound of the sound source corresponding to the sound source identification information.

9. The learning device according to claim 8, wherein the processing circuitry is further configured to update parameters of the neural network in such a manner that the estimation result of the mask information is brought closer to the correct answer mask information.

10. The learning device according to claim 9, wherein the processing circuitry is further configured to update parameters of the neural network in such a manner that supplemental information in each iteration performed by the processing circuitry is brought closer to a correct answer of the supplemental information, the correct answer being given in advance.

11. The learning device according to claim 9, wherein the processing circuitry is further configured to:
output a stop flag enabling the processing circuitry to determine whether to continue an iteration, in addition to the estimation result of the mask information, and
update parameters of the neural network in such a manner that the stop flag is brought closer to a correct answer of the stop flag, the correct answer being given in advance.

12. An estimation method executed by an estimation device, the estimation method comprising:
receiving an input of an input audio signal that is an audio signal in which sounds from a plurality of sound sources are mixed, and an input of supplemental information, and causing a neural network to obtain an estimation result of mask information that identifies a mask for extracting a sound of any one of the sound sources included entire or a part of a signal included in the input audio signal, the signal being identified by the supplemental information; and
executing a process of obtaining the estimation result of the mask information, iteratively, wherein
an estimation result of mask information corresponding to a different sound source is obtained in each iteration, by inputting a different piece of the supplemental information to the neural network, and
the supplemental information is information for identifying a remaining signal resultant of removing a signal of a sound source corresponding to the estimation result of the mask information obtained in a past, the signal being included in the input audio signal, from the input audio signal.

13. A non-transitory computer-readable recording medium storing therein an estimation program that causes a computer to act as the estimation device according to claim 1.

14. A non-transitory computer-readable recording medium storing therein a learning program that causes a computer to act as the learning device according to claim 3.

* * * * *